US008077559B1

(12) United States Patent
Miyauchi et al.

(10) Patent No.: US 8,077,559 B1
(45) Date of Patent: Dec. 13, 2011

(54) THERMALLY-ASSISTED MAGNETIC RECORDING HEAD INCLUDING PLASMON GENERATOR

(75) Inventors: Daisuke Miyauchi, Tokyo (JP); Tetsuya Roppongi, Tokyo (JP); Kosuke Tanaka, Tokyo (JP); Susumu Aoki, Tokyo (JP); Katsuki Kurihara, Tokyo (JP)

(73) Assignee: TDK Corporation, Tokyo (JP)

( * ) Notice: Subject to any disclaimer, the term of this patent is extended or adjusted under 35 U.S.C. 154(b) by 39 days.

(21) Appl. No.: 12/823,491

(22) Filed: Jun. 25, 2010

(51) Int. Cl.
*G11B 11/00* (2006.01)

(52) U.S. Cl. .................. 369/13.33; 369/112.27

(58) Field of Classification Search ............... 369/13.03, 369/13.02, 13.32, 13.24, 13.33, 13.13, 13.12, 369/112.27, 112.09, 112.14, 112.21; 385/31, 385/129; 360/59, 245.3
See application file for complete search history.

(56) References Cited

U.S. PATENT DOCUMENTS

| | | | |
|---|---|---|---|
| 6,649,894 B2 | 11/2003 | Matsumoto et al. | |
| 6,768,556 B1 | 7/2004 | Matsumoto et al. | |
| 7,221,826 B2 | 5/2007 | Hanashima et al. | |
| 7,330,404 B2 | 2/2008 | Peng et al. | |
| 7,454,095 B2 | 11/2008 | Baehr-Jones et al. | |
| 7,821,732 B2 * | 10/2010 | Komura et al. | 360/59 |
| 7,911,882 B2 * | 3/2011 | Shimazawa et al. | 369/13.33 |
| 8,000,178 B2 * | 8/2011 | Shimazawa et al. | 369/13.33 |
| 2007/0139818 A1 | 6/2007 | Shimazawa et al. | |
| 2009/0168220 A1 | 7/2009 | Komura et al. | |
| 2011/0205860 A1 * | 8/2011 | Chou et al. | 369/13.24 |
| 2011/0228420 A1 * | 9/2011 | Hara et al. | 360/59 |

FOREIGN PATENT DOCUMENTS

JP    A-2004-302241    10/2004

OTHER PUBLICATIONS

Fukushima et al.; "Peltier Effect in Sub-micron-Size Metallic Junctions;" *Japanese Journal of Applied Physics*; 2005; pp. L12-L14; vol. 44, No. 1; The Japan Society of Applied Physics.
U.S. Appl. No. 12/557,078, filed Sep. 10, 2009 in the name of Miyauchi et al.
U.S. Appl. No. 12/585,150, filed Sep. 4, 2009 in the name of Sasaki et al.
U.S. Appl. No. 12/710,129, filed Feb. 22, 2010 in the name of Chou et al.

* cited by examiner

*Primary Examiner* — Ali Neyzari
(74) *Attorney, Agent, or Firm* — Oliff & Berridge, PLC

(57) ABSTRACT

An outer surface of a plasmon generator includes: a plasmon exciting part that faces an evanescent light generating surface with a predetermined distance therebetween; and a front end face located in a medium facing surface. The plasmon generator has: first and second sidewall parts that are connected to the plasmon exciting part and increase in distance from each other with increasing distance from the plasmon exciting part; and at least one extended portion connected to an edge of at least one of the first and second sidewall parts opposite from the plasmon exciting part. A magnetic pole has a portion interposed between the first and second sidewall parts. The front end face includes first and second portions lying at ends of the first and second sidewall parts and connected to each other into a V-shape. An end face of the magnetic pole has a portion interposed between the first and second portions of the front end face.

16 Claims, 24 Drawing Sheets

THERMALLY-ASSISTED MAGNETIC RECORDING HEAD INCLUDING PLASMON GENERATOR

BACKGROUND OF THE INVENTION

1. Field of the Invention

The present invention relates to a thermally-assisted magnetic recording head including a plasmon generator for use in thermally-assisted magnetic recording where a magnetic recording medium is irradiated with near-field light to lower the coercivity of the magnetic recording medium for data writing.

2. Description of the Related Art

Recently, magnetic recording devices such as magnetic disk drives have been improved in recording density, and thin-film magnetic heads and magnetic recording media of improved performance have been demanded accordingly. Among the thin-film magnetic heads, a composite thin-film magnetic head has been used widely. The composite thin-film magnetic head has such a structure that a read head including a magnetoresistive element (hereinafter, also referred to as MR element) intended for reading and a write head including an induction-type electromagnetic transducer intended for writing are stacked on a substrate. In a magnetic disk drive, the thin-film magnetic head is mounted on a slider that flies slightly above the surface of the magnetic recording medium.

Magnetic recording media are discrete media each made of an aggregate of magnetic fine particles, each magnetic fine particle forming a single-domain structure. A single recording bit of a magnetic recording medium is composed of a plurality of magnetic fine particles. For improved recording density, it is necessary to reduce asperities at the borders between adjoining recording bits. To achieve this, the magnetic fine particles must be made smaller. However, making the magnetic fine particles smaller causes the problem that the thermal stability of magnetization of the magnetic fine particles decreases with decreasing volume of the magnetic fine particles. To solve this problem, it is effective to increase the anisotropic energy of the magnetic fine particles. However, increasing the anisotropic energy of the magnetic fine particles leads to an increase in coercivity of the magnetic recording medium, and this makes it difficult to perform data writing with existing magnetic heads.

To solve the foregoing problems, there has been proposed a technique so-called thermally-assisted magnetic recording. This technique uses a magnetic recording medium having high coercivity. When writing data, a magnetic field and heat are simultaneously applied to the area of the magnetic recording medium where to write data, so that the area rises in temperature and drops in coercivity for data writing. Hereinafter, a magnetic head for use in thermally-assisted magnetic recording will be referred to as a thermally-assisted magnetic recording head.

In thermally-assisted magnetic recording, near-field light is typically used as a means for applying heat to the magnetic recording medium. A commonly known method for generating near-field light is to use a near-field optical probe or so-called plasmon antenna, which is a piece of metal that generates near-field light from plasmons excited by irradiation with light.

However, the plasmon antenna which generates near-field light by direct irradiation with light is known to exhibit very low efficiency of transformation of the applied light into near-field light. The energy of the light applied to the plasmon antenna is mostly reflected off the surface of the plasmon antenna, or transformed into thermal energy and absorbed by the plasmon antenna. The plasmon antenna is small in volume since the size of the plasmon antenna is set to be smaller than or equal to the wavelength of the light. The plasmon antenna therefore shows a significant increase in temperature when it absorbs the thermal energy.

Such a temperature increase makes the plasmon antenna expand in volume and protrude from a medium facing surface, which is the surface of the thermally-assisted magnetic recording head to face the magnetic recording medium. This causes an end of the read head located in the medium facing surface to get farther from the magnetic recording medium, thereby causing the problem that a servo signal cannot be read during write operations.

There has been known a technique in which a dielectric and a metal are arranged to face each other with a predetermined gap therebetween, and surface plasmons are excited on the metal by utilizing evanescent light that results from the total reflection of the light propagated through the dielectric at the surface of the dielectric. As a related technique, U.S. Pat. No. 7,454,095 discloses a technique in which a metal waveguide and a dielectric waveguide are arranged to face each other with a predetermined gap therebetween, and the metal waveguide is coupled with the dielectric waveguide in a surface plasmon mode. It is then conceivable to establish coupling between the light propagated through the waveguide's core and a plasmon generator, a piece of metal, in a surface plasmon mode through a buffer part so that surface plasmons are excited on the plasmon generator, instead of directly irradiating the plasmon generator with the light. According to such a technique, it is possible to transform the light propagated through the core into near-field light with high efficiency. Since the plasmon generator is not directly irradiated with the light propagated through the core, it is also possible to prevent the plasmon generator from excessively increasing in temperature.

Using the foregoing technique, part of the energy of the light propagated through the core is transformed into heat in the plasmon generator, and the plasmon generator rises in temperature. Even with the foregoing technique, it is therefore desired to develop a technology that can further suppress a rise in temperature of the plasmon generator.

For thermally-assisted magnetic recording, it is desired that the position of occurrence of the write magnetic field and the position of occurrence of the near-field light be located as close as possible in the medium facing surface. U.S. Patent Application Publication No. 2007/139818 A1 discloses a magnetic head in which a near-field light generating part, which generates near-field light when irradiated with laser light; and an end of a main magnetic pole layer are arranged to overlap each other directly or through a dielectric layer in the medium facing surface. U.S. Patent Application Publication No. 2009/168220 A1 discloses a magnetic head in which at least a part of a main magnetic pole is interposed between first and second near-field light generating parts, each of which generates near-field light when irradiated with laser light.

The magnetic head disclosed in U.S. Patent Application Publication No. 2007/139818 A1 and the magnetic head disclosed in U.S. Patent Application Publication No. 2009/168220 A1 both make it possible to locate the position of occurrence of the write magnetic field and the position of occurrence of the near-field light close to each other, but neither can suppress a rise in temperature of the near-field light generating part since the near-field light generating part is directly irradiated with light.

When a thermally-assisted magnetic recording head employs such a configuration that the light propagated through the core is coupled with the plasmon generator in a surface plasmon mode through a buffer part, there arises the following problem if the position of occurrence of the write magnetic field and the position of occurrence of the near-field light are located close to each other. That is, in such a case, both the core and the magnetic pole need to be located near the plasmon generator. It follows that the magnetic pole is located near the core. The magnetic pole is typically made of a magnetic metal material. The presence of such a magnetic pole near the core causes the problem that part of the light propagated through the core is absorbed by the magnetic pole and the use efficiency of the light propagated through the core thereby decreases.

OBJECT AND SUMMARY OF THE INVENTION

It is an object of the present invention to provide a thermally-assisted magnetic recording head that allows efficient use of the light propagated through the core of the waveguide, allows the position of occurrence of the write magnetic field and the position of the occurrence of the near-field light to be close to each other, and allows suppression of a temperature rise of the plasmon generator, and to provide a head gimbal assembly and a magnetic recording device that each include such a thermally-assisted magnetic recording head.

A thermally-assisted magnetic recording head of the present invention includes: a medium facing surface that faces a magnetic recording medium; a magnetic pole that has an end face located in the medium facing surface and produces a write magnetic field for writing data on the magnetic recording medium; a waveguide including a core and a clad, the core propagating light; and a plasmon generator. The core has an evanescent light generating surface that generates evanescent light based on the light propagated through the core. The plasmon generator has an outer surface, the outer surface including: a plasmon exciting part that faces the evanescent light generating surface with a predetermined distance therebetween; and a front end face located in the medium facing surface.

The plasmon generator has: a first sidewall part and a second sidewall part that are each connected to the plasmon exciting part, the first and second sidewall parts increasing in distance from each other with increasing distance from the plasmon exciting part; and at least one extended portion that is connected to an edge of at least one of the first and second sidewall parts, the edge being opposite from the plasmon exciting part. From the edge of the at least one of the first and second sidewall parts opposite from the plasmon exciting part, the at least one extended portion extends parallel to the evanescent light generating surface and away from both the first and second sidewall parts. The magnetic pole has a portion interposed between the first and second sidewall parts.

The front end face includes: a first portion and a second portion that lie at respective ends of the first and second sidewall parts and are connected to each other into a V-shape; at least one third portion that lies at an end of the at least one extended portion; and a near-field light generating edge that lies at an end of the plasmon exciting part. The end face of the magnetic pole has a portion interposed between the first and second portions of the front end face.

A surface plasmon is excited on the plasmon exciting part through coupling with the evanescent light generated from the evanescent light generating surface. The near-field light generating edge generates near-field light based on the surface plasmon excited on the plasmon exciting part.

In the thermally-assisted magnetic recording head of the present invention, the at least one extended portion of the plasmon generator has a heat sink function of dissipating heat from the plasmon generator to outside.

In the thermally-assisted magnetic recording head of the present invention, the magnetic pole may be in contact with the plasmon generator.

In the thermally-assisted magnetic recording head of the present invention, the first and second sidewall parts may be connected to each other so that the connected first and second sidewall parts have a V-shaped cross section parallel to the medium facing surface. In such a case, the plasmon exciting part may include a propagative edge that lies at an end of the connected first and second sidewall parts closer to the evanescent light generating surface. The near-field light generating edge may lie at an end of the propagative edge.

In the thermally-assisted magnetic recording head of the present invention, the plasmon generator may further have a bottom part that is shaped like a plate and connects the first and second sidewall parts to each other at their respective edges closer to the evanescent light generating surface. In such a case, the plasmon exciting part may include a flat surface part that is formed by a surface of the bottom part that is closer to the evanescent light generating surface. The flat surface part may include a width changing portion. The width changing portion may have a width that decreases with decreasing distance to the medium facing surface, the width being in a direction parallel to the medium facing surface and the evanescent light generating surface.

The thermally-assisted magnetic recording head of the present invention may further include a buffer part that is located between the evanescent light generating surface and the plasmon exciting part and has a refractive index lower than that of the core.

In the thermally-assisted magnetic recording head of the present invention, a dimension of the first and second sidewall parts in a direction perpendicular to the evanescent light generating surface may fall within a range of 200 to 400 nm.

In the thermally-assisted magnetic recording head of the present invention, a dimension of the front end face on a virtual straight line that passes through the near-field light generating edge and extends in the direction perpendicular to the evanescent light generating surface may fall within a range of 20 to 70 nm.

The thermally-assisted magnetic recording head of the present invention may further include a conductor made of a conductive material, the conductor having a Seebeck coefficient different from that of the plasmon generator and being in contact with the plasmon generator. In such a case, heat absorption by the Peltier effect occurs in a contact area between the plasmon generator and the conductor when a current is made to flow from one of the plasmon generator and the conductor, the one being lower in Seebeck coefficient, to the other which is higher in Seebeck coefficient, through the contact area. In such a case, the plasmon generator may be made of Au, and the conductive material may contain at least one of Co, Ni, and a CuNi alloy.

When the thermally-assisted magnetic recording head of the present invention includes the above-mentioned conductor, the conductor may be in contact with the plasmon generator at least on a virtual straight line that passes through the near-field light generating edge and extends in the direction perpendicular to the evanescent light generating surface. In such a case, a dimension of the conductor on the virtual straight line may fall within a range of 20 to 50 nm. At least part of the conductor may be interposed between the plasmon generator and the magnetic pole.

The thermally-assisted magnetic recording head of the present invention may further include a first electrode that is electrically connected to the plasmon generator and a second electrode that is electrically connected to the conductor. A voltage for generating a current may be applied to the first and second electrodes. Alternatively, the conductor may be electrically connected to the magnetic pole, and a voltage for generating a current may be applied to the plasmon generator and the magnetic pole.

A head gimbal assembly of the present invention includes: the thermally-assisted magnetic recording head of the present invention; and a suspension that supports the thermally-assisted magnetic recording head. A magnetic recording device of the present invention includes: a magnetic recording medium; the thermally-assisted magnetic recording head of the present invention; and a positioning device that supports the thermally-assisted magnetic recording head and positions the same with respect to the magnetic recording medium.

According to the thermally-assisted magnetic recording head, the head gimbal assembly and the magnetic recording device of the present invention, a surface plasmon is excited on the plasmon exciting part of the plasmon generator through coupling with the evanescent light generated from the evanescent light generating surface of the core of the waveguide. The near-field light generating edge generates near-field light based on the surface plasmon. According to the present invention, it is thereby possible to transform the light propagated through the core into near-field light with high efficiency.

In the present invention, the front end face of the plasmon generator has the first and second portions that are connected to each other into a V-shape, and the near-field light generating edge lying at an end of the plasmon exciting part. The end face of the magnetic pole has the portion interposed between the first and second portions of the front end face. Consequently, according to the present invention, it is possible to locate the position of occurrence of the write magnetic field and the position of occurrence of the near-field light close to each other.

In the present invention, the plasmon generator has at least one extended portion having the heat sink function as described above. Consequently, according to the present invention, it is possible to suppress a rise in temperature of the plasmon generator.

In the present invention, the thermally-assisted magnetic recording head may include a conductor made of a conductive material, the conductor having a Seebeck coefficient different from that of the plasmon generator and being in contact with the plasmon generator. In such a case, it is possible to cool the plasmon generator by the Peltier effect and further suppress a rise in temperature of the plasmon generator.

Other and further objects, features and advantages of the present invention will appear more fully from the following description.

DETAILED DESCRIPTION OF THE PREFERRED EMBODIMENTS

First Embodiment

Figure 5:
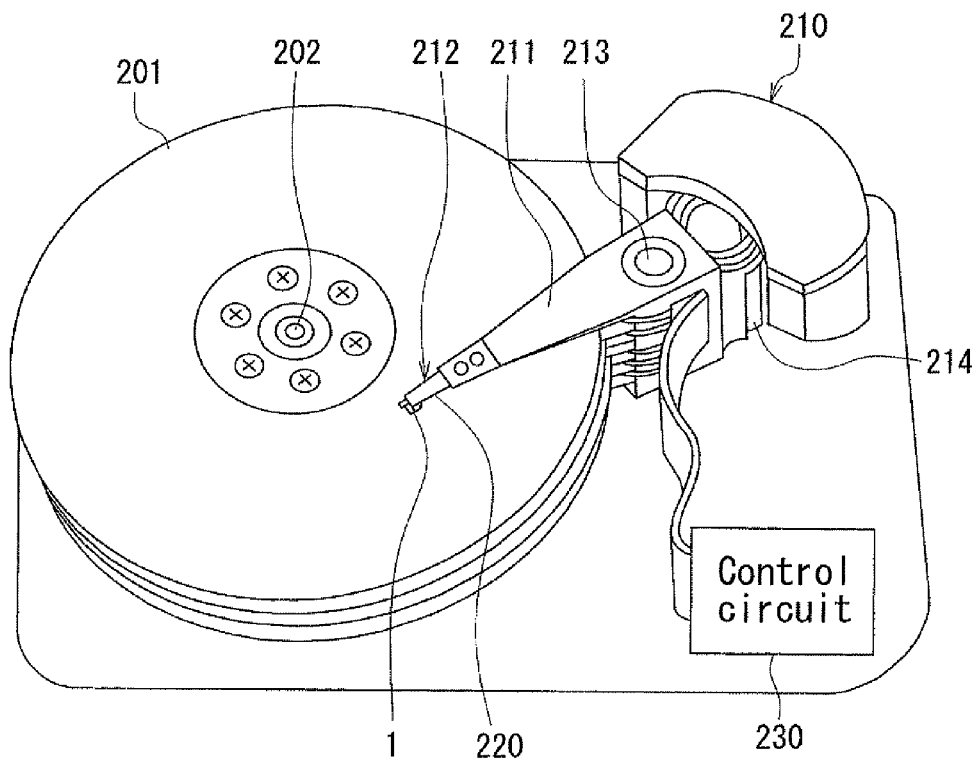
FIG. 5 is a perspective view showing the magnetic recording device according to the first embodiment of the invention.

Preferred embodiments of the present invention will now be described in detail with reference to the drawings. First, reference is made to FIG. 5 to describe a magnetic disk drive that functions as a magnetic recording device according to a first embodiment of the invention. As shown in FIG. 5, the magnetic disk drive includes a plurality of magnetic disks 201 as a plurality of magnetic recording media, and a spindle motor 202 for rotating the plurality of magnetic disks 201. The magnetic disks 201 of the present embodiment are for use in perpendicular magnetic recording. The magnetic disks 201 each have such a structure that a soft magnetic backing layer, a middle layer, and a magnetic recording layer (perpendicular magnetization layer) are stacked in this order on a disk substrate.

The magnetic disk drive further includes an assembly carriage device 210 having a plurality of driving arms 211, and a plurality of head gimbal assemblies 212 attached to respective distal ends of the driving arms 211. The head gimbal assemblies 212 each include a thermally-assisted magnetic recording head 1 according to the present embodiment, and a suspension 220 that supports the thermally-assisted magnetic recording head 1.

The assembly carriage device 210 is a device for positioning the thermally-assisted magnetic recording heads 1 on tracks that are formed in the magnetic recording layers of the magnetic disks 201 and that have recording bits aligned thereon. The assembly carriage device 210 further has a pivot bearing shaft 213 and a voice coil motor 214. The plurality of driving arms 211 are stacked in a direction along the pivot bearing shaft 213 and are pivotable about the shaft 213 by being driven by the voice coil motor 214. The magnetic recording device of the present invention is not structurally limited to the magnetic disk drive having the above-described configuration. For example, the magnetic recording device of the present invention may be provided with a single magnetic disk 201, a single driving arm 211, a single head gimbal assembly 212 and a single thermally-assisted magnetic recording head 1.

The magnetic disk drive further includes a control circuit 230 that controls the read/write operations of the thermally-assisted magnetic recording heads 1 and also controls the light emitting operation of a laser diode serving as a light source for generating laser light for thermally-assisted magnetic recording described later.

Figure 6:
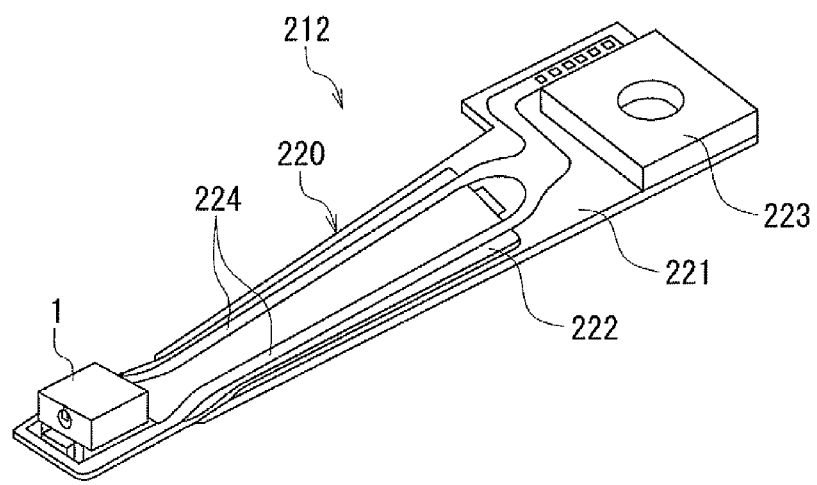
FIG. 6 is a perspective view showing a head gimbal assembly according to the first embodiment of the invention.

FIG. 6 is a perspective view showing the head gimbal assembly 212 of FIG. 5. As previously described, the head gimbal assembly 212 includes the thermally-assisted magnetic recording head 1 and the suspension 220. The suspension 220 has a load beam 221, a flexure 222 fixed to the load beam 221 and having flexibility, a base plate 223 provided at the base part of the load beam 221, and a wiring member 224 provided on the load beam 221 and the flexure 222. The wiring member 224 includes a plurality of leads. The thermally-assisted magnetic recording head 1 is fixed to the flexture 222 at the distal end of the suspension 220 such that the head 1 faces the surface of the magnetic disk 201 with a predetermined spacing (flying height). One end of the wiring member 224 is electrically connected to a plurality of terminals of the thermally-assisted magnetic recording head 1. The other end of the wiring member 224 is provided with a plurality of pad-shaped terminals arranged at the base part of the load beam 221.

The assembly carriage device 210 and the suspension 220 correspond to the positioning device of the present invention. The head gimbal assembly of the present invention is not limited to the one having the configuration shown in FIG. 6. For example, the head gimbal assembly of the present invention may have an IC chip for driving the head that is mounted somewhere along the suspension 220.

Figure 7:
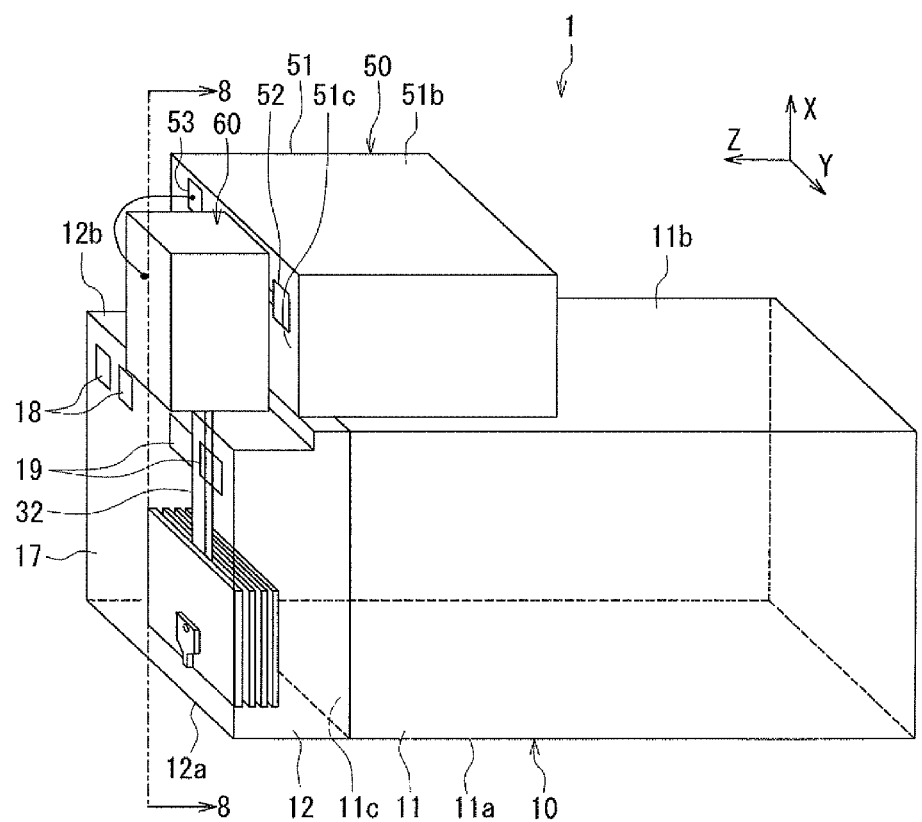
FIG. 7 is a perspective view showing the thermally-assisted magnetic recording head according to the first embodiment of the invention.
Figure 8:
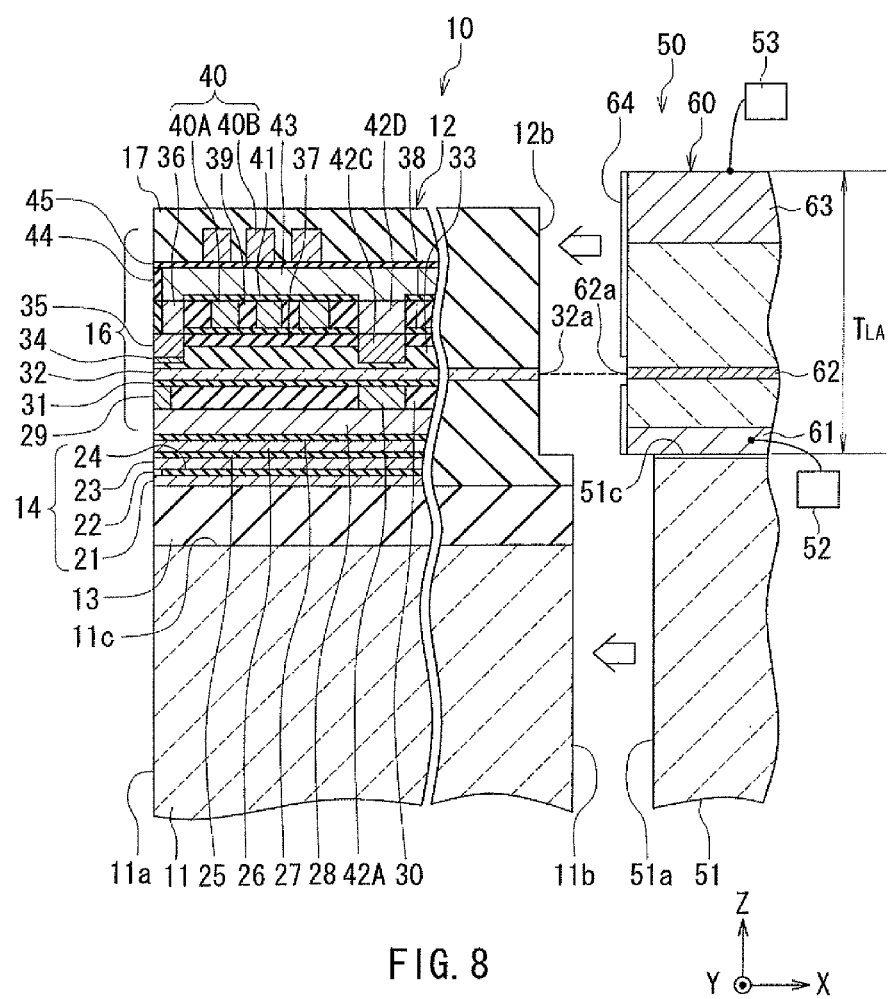
FIG. 8 shows a cross section taken along line 8-8 of FIG. 7.
Figure 9:
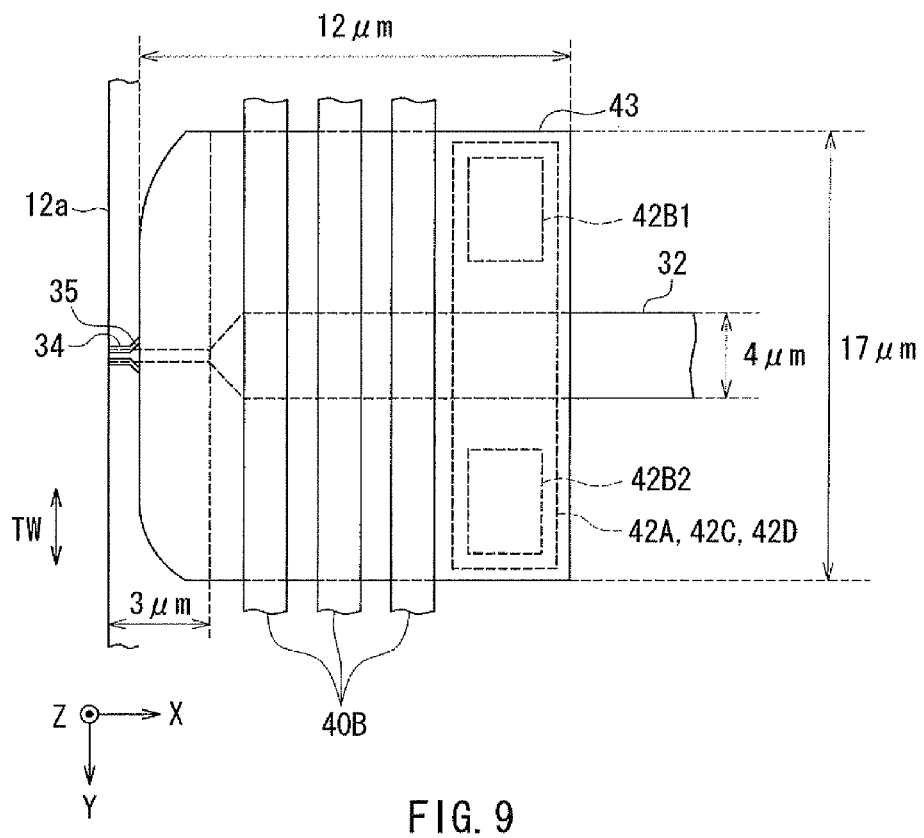
FIG. 9 is a plan view showing a part of the head unit of the thermally-assisted magnetic recording head according to the first embodiment of the invention.

The configuration of the thermally-assisted magnetic recording head 1 according to the present embodiment will now be described with reference to FIG. 7 to FIG. 9. FIG. 7 is a perspective view showing the thermally-assisted magnetic recording head 1. FIG. 8 shows a cross section taken along line 8-8 of FIG. 7. FIG. 9 is a plan view showing a part of a head unit of the thermally-assisted magnetic recording head. The thermally-assisted magnetic recording head 1 includes a slider 10 and a light source unit 50. FIG. 8 shows the state where the slider 10 and the light source unit 50 are separated from each other.

The slider 10 includes a slider substrate 11 and a head unit 12. The slider substrate 11 is rectangular-solid-shaped and is made of a ceramic material such as aluminum oxide-titanium carbide ($Al_2O_3$—TiC) The slider substrate 11 has a medium facing surface 11a that faces the magnetic disk 201, a rear surface 11b on the opposite side from the medium facing surface 11a, and four surfaces that connect the medium facing surface 11a to the rear surface 11b. One of the four surfaces that connect the medium facing surface 11a to the rear surface 11b is an element-forming surface 11c. The element-forming surface 11c is perpendicular to the medium facing surface 11a. The head unit 12 is disposed on the element-forming surface 11c. The medium facing surface 11a is processed so as to obtain an appropriate flying height of the slider 10 with respect to the magnetic disk 201. The head unit 12 has a medium facing surface 12a that faces the magnetic disk 201, and a rear surface 12b on the opposite side from the medium facing surface 12a. The medium facing surface 12a is parallel to the medium facing surface 11a of the slider substrate 11.

Where the components of the head unit 12 are concerned, with respect to a reference position, a position located in a direction that extends perpendicular to the element-forming surface 11c and away from the element-forming surface 11c is defined as "above", and a position located in a direction opposite to the above-mentioned direction is defined as "below". Where the layers included in the head unit 12 are concerned, the surface closer to the element-forming surface 11c is defined as a "bottom surface," and the surface farther from the element-forming surface 11c as a "top surface."

Moreover, X direction, Y direction, Z direction, −X direction, −Y direction, and −Z direction will be defined as follows. The X direction is a direction perpendicular to the medium facing surface 11a and from the medium facing surface 11a to the rear surface 11b. The Y direction is a direction parallel to the medium facing surface 11a and the element-forming surface 11c and from the back side to the front side of FIG. 8. The Z direction is a direction that extends perpendicular to the element-forming surface 11c and away from the element-forming surface 11c. The −X direction, the −Y direction, and the −Z direction are opposite to the X direction, the Y direction, and the Z direction, respectively. As viewed from the slider 10, the magnetic disk 201 moves in the Z direction. The slider 10 has an air inflow end (a leading end) at the end of the medium facing surface 11a in the −Z direction. The slider 10 has an air outflow end (a trailing end) at the end of the medium facing surface 12a in the Z direction. Track width direction TW is a direction parallel to the Y direction.

The light source unit 50 includes a laser diode 60 serving as a light source for emitting laser light, and a support member 51 that is shaped like a rectangular solid and supports the laser diode 60. The support member 51 is made of, for example, a ceramic material such as aluminum oxide-titanium carbide ($Al_2O_3$—TiC). The support member 51 has a bonding surface 51a, a rear surface 51b on the opposite side from the bonding surface 51a, and four surfaces that connect the bonding surface 51a to the rear surface 51b. One of the four surfaces that connect the bonding surface 51a to the rear surface 51b is a light-source-mounting surface 51c. The bonding surface 51a is the surface to be bonded to the rear surface 11b of the slider substrate 11. The light-source-mounting surface 51c is perpendicular to the bonding surface 51a and parallel to the element-forming surface 11c. The laser diode 60 is mounted on the light-source-mounting surface 51c. The support member 51 may have a heat sink function of dissipating heat generated by the laser diode 60, in addition to the function of supporting the laser diode 60.

As shown in FIG. 8, the head unit 12 includes an insulating layer 13 disposed on the element-forming surface 11c, and also includes a read head 14, a write head 16, and a protection layer 17 that are stacked in this order on the insulating layer 13. The insulating layer 13 and the protection layer 17 are each made of an insulating material such as $Al_2O_3$ (hereinafter, also referred to as alumina).

The read head 14 includes: a bottom shield layer 21 disposed on the insulating layer 13; an MR element 22 disposed on the bottom shield layer 21; a top shield layer 23 disposed on the MR element 22; and an insulating layer 24 disposed between the bottom shield layer 21 and the top shield layer 23 around the MR element 22. The bottom shield layer 21 and the top shield layer 23 are each made of a soft magnetic material. The insulating layer 24 is made of an insulating material such as alumina.

An end of the MR element 22 is located in the medium facing surface 12a. The MR element may be a giant magnetoresistive (GMR) element or a tunneling magnetoresistive (TMR) element, for example. The GMR element may be of either the current-in-plane (CIP) type in which a sense current for use in magnetic signal detection is fed in a direction nearly parallel to the plane of layers constituting the GMR element or the current-perpendicular-to-plane (CPP) type in which the sense current is fed in a direction nearly perpendicular to the plane of layers constituting the GMR element. If the MR element 22 is a TMR element or a CPP-type GMR element, the bottom shield layer 21 and the top shield layer 23 may also function as electrodes for feeding the sense current to the MR element 22. If the MR element 22 is a CIP-type GMR element, insulating films are respectively provided between the MR element 22 and the bottom shield layer 21 and between the MR element 22 and the top shield layer 23, and two leads are provided between these insulating films in order to feed the sense current to the MR element 22.

The head unit 12 further includes an insulating layer 25 disposed on the top shield layer 23, a middle shield layer 26 disposed on the insulating layer 25, and an insulating layer 27 disposed on the middle shield layer 26. The middle shield layer 26 has the function of shielding the MR element 22 from a magnetic field produced in the write head 16. The insulating layers 25 and 27 are each made of an insulating material such as alumina. The middle shield layer 26 is made of a soft magnetic material. The insulating layer 25 and the middle shield layer 26 may be omitted.

The write head 16 of the present embodiment is for use in perpendicular magnetic recording. The write head 16 includes a bottom yoke layer 28 disposed on the insulating layer 27, a bottom shield layer 29 disposed on the bottom yoke layer 28 in the vicinity of the medium facing surface 12a, a coupling layer 42A disposed on the bottom yoke layer 28 at a position away from the medium facing surface 12a, and an insulating layer 30 disposed around the bottom yoke layer 28, the bottom shield layer 29 and the coupling layer 42A. The bottom yoke layer 28, the bottom shield layer 29, and the coupling layer 42A are each made of a soft magnetic material. The insulating layer 30 is made of an insulating material such as alumina.

The write head 16 further includes a waveguide that includes a core 32 and a clad. The clad includes a clad layer 31 and a clad layer 33. The clad layer 31 is disposed over the bottom shield layer 29, the insulating layer 30 and the coupling layer 42A. The core 32 is disposed on the clad layer 31. The clad layer 33 covers the clad layer 31 and the core 32. The core 32 extends in a direction perpendicular to the medium facing surface 12a (X direction). The core 32 has an incident end 32a, an end face closer to the medium facing surface 12a, a top surface, a bottom surface, and two side surfaces. The end face of the core 32 may be located in the medium facing surface 12a or away from the medium facing surface 12a. FIG. 8 shows an example where the end face of the core 32 is located in the medium facing surface 12a. The core 32 propagates laser light that is emitted from the laser diode 60 and incident on the incident end 32a.

The core 32 is made of a dielectric material that transmits the laser light. Each of the clad layers 31 and 33 is made of a dielectric material and has a refractive index lower than that of the core 32. For example, if the laser light has a wavelength of 600 nm and the core 32 is made of $Al_2O_3$ (refractive index n=1.63), the clad layers 31 and 33 may be made of $SiO_2$ (refractive index n=1.46). If the core 32 is made of tantalum oxide such as $Ta_2O_5$ (n=2.16), the clad layers 31 and 33 may be made of $SiO_2$ (n=1.46) or $Al_2O_3$ (n=1.63).

The write head 16 further includes a plasmon generator 34 disposed above the core 32 in the vicinity of the medium facing surface 12a, and a magnetic pole 35 disposed at such a position that the plasmon generator 34 is interposed between the magnetic pole 35 and the core 32. The magnetic pole 35 has a top surface that is located at a level higher than the top surface of the clad layer 33. The plasmon generator 34 is made of a conductive material such as metal. For example, the plasmon generator 34 may be made of one element selected from the group consisting of Pd, Pt, Rh, Ir, Ru, Au, Ag, Cu, and Al, or of an alloy composed of two or more of these elements. The magnetic pole 35 is made of a soft magnetic material, or a magnetic metal material in particular. FIG. 9 shows an example of the length of the magnetic pole 35 in the X direction. In this example, the magnetic pole 35 has a length of 3 μm in the X direction. The shapes and locations of the core 32, the plasmon generator 34 and the magnetic pole 35 will be detailed later.

The write head 16 further includes a coupling layer 42C at a position away from the medium facing surface 12a. A part of the coupling layer 42C is embedded in the clad layer 33. The coupling layer 42C is located above the coupling layer 42A. The coupling layer 42C has a top surface at a level higher than the top surface of the clad layer 33. The coupling layer 42C is made of a soft magnetic material.

As shown in FIG. 9, the write head 16 further includes two coupling portions 42B1 and 42B2 embedded in the clad layers 31 and 33. The coupling portions 42B1 and 42B2 are each made of a soft magnetic material. The coupling portions 42B1 and 42B2 are located on opposite sides of the core 32 in the track width direction TW, each at a distance from the core 32. The bottom surfaces of the coupling portions 42B1 and 42B2 are in contact with the top surface of the coupling layer 42A. The top surfaces of the coupling portions 42B1 and 42B2 are in contact with the bottom surface of the coupling layer 42C.

The write head 16 further includes an insulating layer 37 disposed around the magnetic pole 35 and the coupling layer 42C on the clad layer 33, an insulating layer 38 disposed on the insulating layer 37, a coupling layer 36 disposed on the magnetic pole 35, and a coupling layer 42D disposed on the coupling layer 42C. The coupling layer 36 has an end face that is closer to the medium facing surface 12a, the end face being located at a distance from the medium facing surface 12a.

The write head 16 further includes a plurality of first coil elements 40A disposed on the insulating layer 38, and an insulating layer 39 disposed around the coupling layers 36 and 42D and the first coil elements 40A. The first coil elements 40A are arranged to align in the X direction. Although not shown, the first coil elements 40A each have a main part that extends in the track width direction TW (Y direction). The first coil elements 40A are each made of a conductive material such as copper. The coupling layers 36 and 42D are each made of a soft magnetic material. The insulating layers 37, 38, and 39 are each made of an insulating material such as alumina.

The write head 16 further includes an insulating layer 41 disposed to cover the first coil elements 40A, a top yoke layer 43 disposed over the coupling layers 36 and 42D and the insulating layer 41, and an insulating layer 44 disposed around the top yoke layer 43. The top yoke layer 43 is in contact with the top surface of the coupling layer 36 at a position near the medium facing surface 12a, and in contact with the top surface of the coupling layer 42D at a position away from the medium facing surface 12a. FIG. 9 shows an example of the dimensions of the top yoke layer 43 in the X direction and in the track width direction TW (Y direction). In this example, the top yoke layer 43 has a dimension of 12 μm in the X direction and a dimension of 17 μm in the track width direction TW (Y direction). The top yoke layer 43 is made of a soft magnetic material. The insulating layers 41 and 44 are each made of an insulating material such as alumina.

The write head 16 further includes an insulating layer 45 disposed over the top yoke layer 43 and the insulating layer 44, and a plurality of second coil elements 40B disposed on the insulating layer 45. The insulating layer 45 is made of an insulating material such as alumina.

FIG. 9 shows the second coil elements 40B. The second coil elements 40B are arranged to align in the X direction. The second coil elements 40B each have a main part that extends in the track width direction TW (Y direction). The second coil elements 40B are each made of a conductive material such as copper.

Although not shown, the thermally-assisted magnetic recording head 1 further includes a plurality of connecting portions. The plurality of connecting portions connect the plurality of first coil elements 40A to the plurality of second coil elements 40B so as to form a coil 40 wound around the top yoke layer 43 helically. The plurality of connecting portions are provided to penetrate the insulating layers 41, 44, and 45. The connecting portions are each made of a conductive material such as copper.

In the write head 16, the bottom shield layer 29, the bottom yoke layer 28, the coupling layer 42A, the coupling portions 42B1 and 42B2, the coupling layers 42C and 42D, the top yoke layer 43, the coupling layer 36, and the magnetic pole 35 form a magnetic path for passing a magnetic flux corresponding to the magnetic field produced by the coil 40. The magnetic pole 35 has an end face located in the medium facing surface 12a, allows the magnetic flux corresponding to the magnetic field produced by the coil 40 to pass, and produces a write magnetic field for writing data on the magnetic disk 201 by means of the perpendicular magnetic recording system. The bottom shield layer 29 takes in a magnetic flux that is generated from the end face of the magnetic pole 35 and that expands in directions other than the direction perpendicular to the plane of the magnetic disk 201, and thereby prevents the magnetic flux from reaching the magnetic disk 201.

As shown in FIG. 8, the protection layer 17 is disposed to cover the write head 16. As shown in FIG. 7, the head unit 12 further includes a pair of terminals 18 that are disposed on the top surface of the protection layer 17 and electrically connected to the MR element 22, and another pair of terminals 19 that are disposed on the top surface of the protection layer 17 and electrically connected to the coil 40. These terminals 18 and 19 are electrically connected to the plurality of pad-shaped terminals of the wiring member 224 shown in FIG. 6.

The laser diode 60 may be a laser diode of InP type, GaAs type, GaN type or the like that is commonly used for such applications as communications, optical disc storage and material analysis. The laser diode 60 may emit laser light of any wavelength within the range of, for example, 375 nm to 1.7 μm. Specifically, the laser diode 60 may be an InGaAsP/InP quaternary mixed crystal laser diode having an emittable wavelength range of 1.2 to 1.67 μm, for example.

As shown in FIG. 8, the laser diode 60 has a multilayer structure including a lower electrode 61, an active layer 62, and an upper electrode 63. A reflecting layer 64 made of, for example, $SiO_2$ or $Al_2O_3$, is formed on two cleavage planes of the multilayer structure so as to excite oscillation by total reflection of light. The reflecting layer 64 has an opening for emitting laser light in the position of the active layer 62 including an emission center 62a. The laser diode 60 has a thickness $T_{LA}$ of around 60 to 200 μm, for example.

The light source unit 50 further includes a terminal 52 disposed on the light-source-mounting surface 51c and electrically connected to the lower electrode 61, and a terminal 53 disposed on the light-source-mounting surface 51c and electrically connected to the upper electrode 63. These terminals 52 and 53 are electrically connected to the plurality of pad-shaped terminals of the wiring member 224 shown in FIG. 6. When a predetermined voltage is applied to the laser diode 60 through the terminals 52 and 53, laser light is emitted from the emission center 62a of the laser diode 60. The laser light to be emitted from the laser diode 60 is preferably TM-mode polarized light whose electric field oscillates in a direction perpendicular to the plane of the active layer 62.

The laser diode 60 can be driven by a power supply inside the magnetic disk drive. The magnetic disk drive usually includes a power supply that generates a voltage of 2 V or so, for example. This supply voltage is sufficient to drive the laser diode 60. The laser diode 60 has a power consumption of, for example, several tens of milliwatts or so, which can be adequately covered by the power supply in the magnetic disk drive.

The light source unit 50 is fixed to the slider 10 by bonding the bonding surface 51a of the support member 51 to the rear surface 11b of the slider substrate 11, as shown in FIG. 8. The laser diode 60 and the core 32 are positioned so that the laser light emitted from the laser diode 60 will be incident on the incident end 32a of the core 32.

Figure 1:
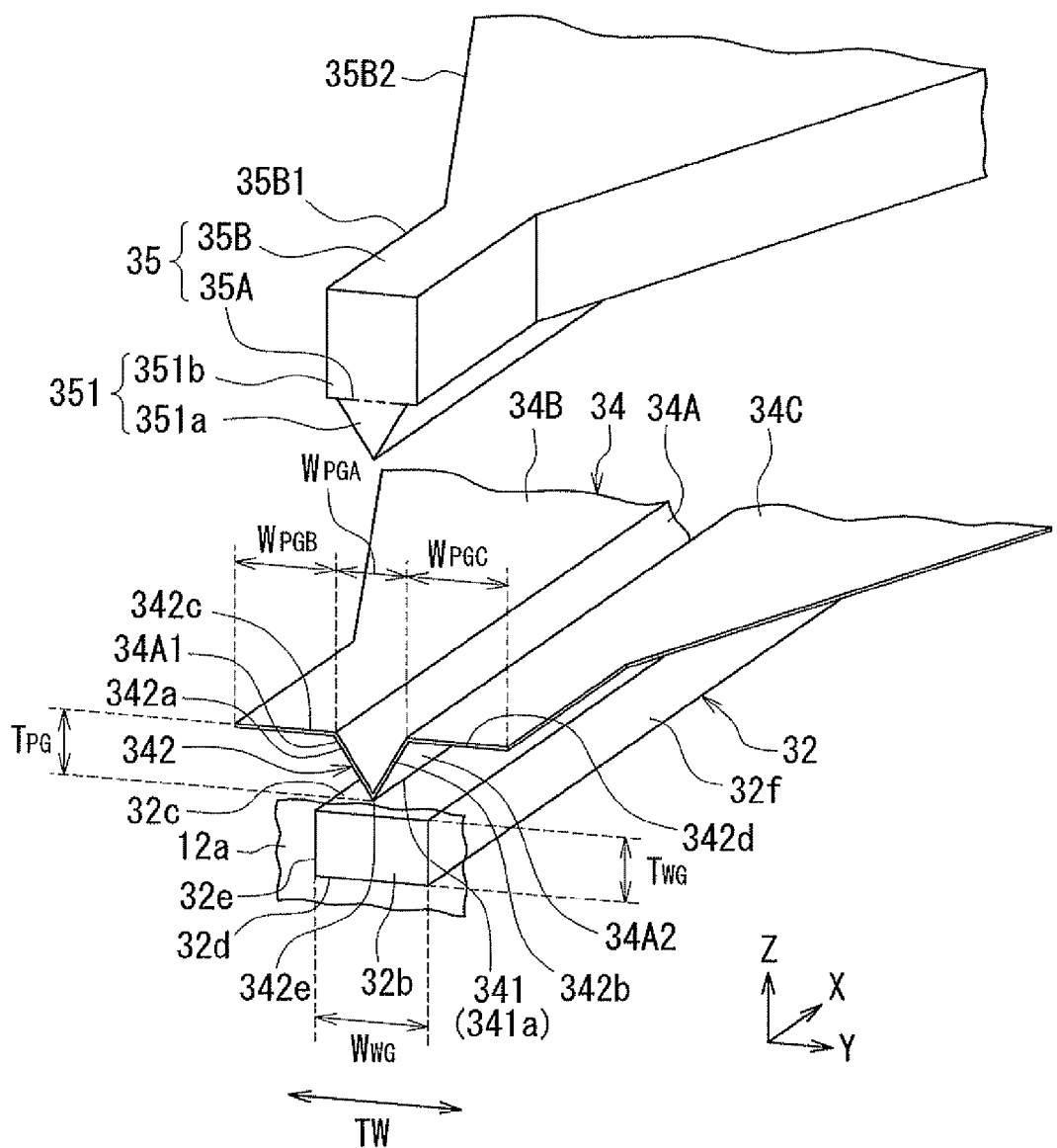
FIG. 1 is a perspective view showing a waveguide's core, a plasmon generator, and a magnetic pole of a thermally-assisted magnetic recording head according to a first embodiment of the invention.
Figure 2:
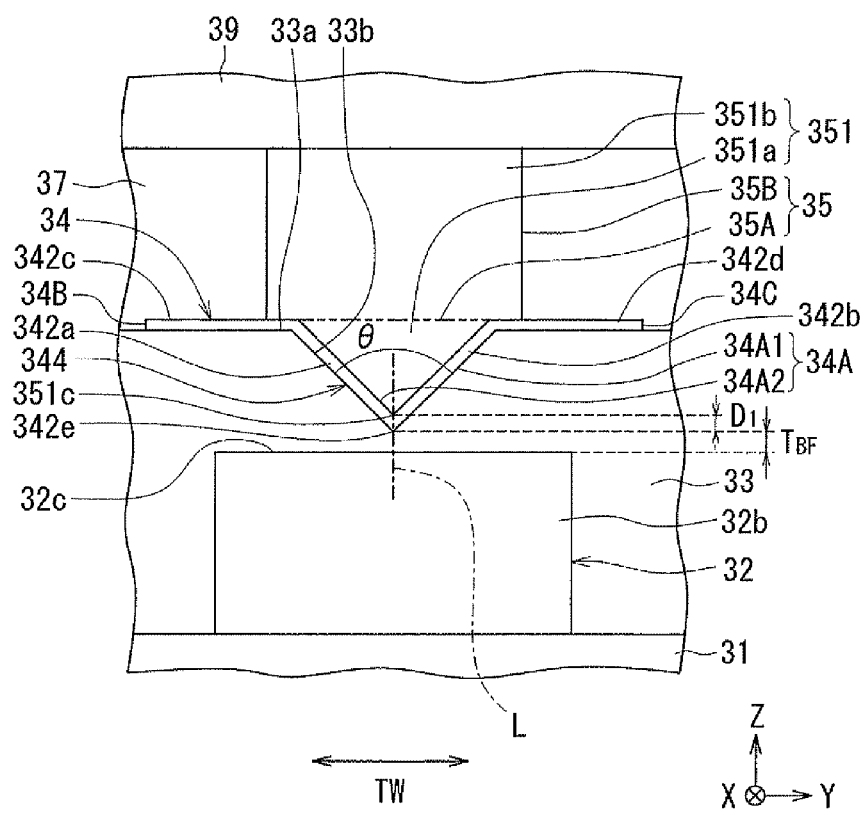
FIG. 2 is a front view showing a part of the medium facing surface of a head unit of the thermally-assisted magnetic recording head according to the first embodiment of the invention.
Figure 3:
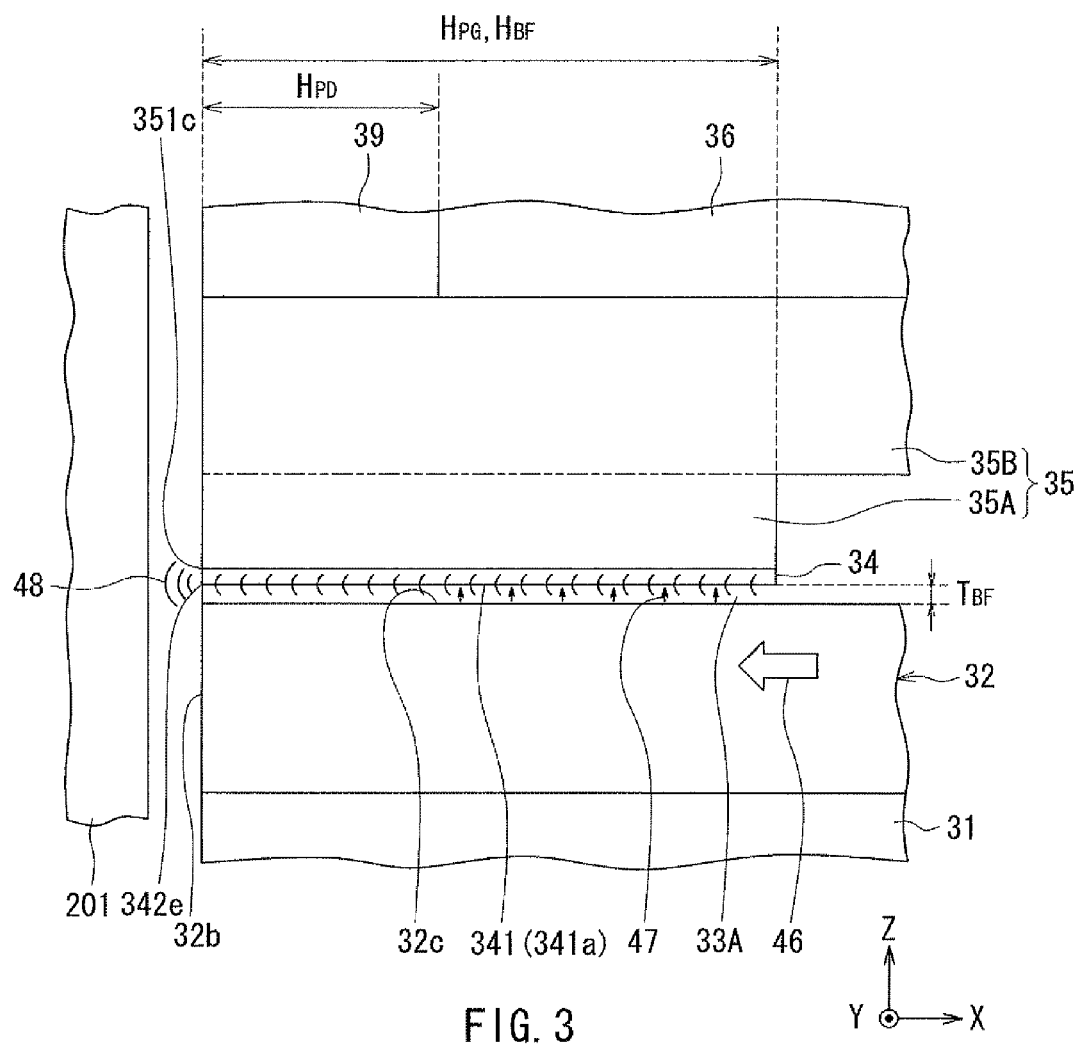
FIG. 3 is a cross-sectional view showing the core, the plasmon generator, and the magnetic pole of the thermally-assisted magnetic recording head according to the first embodiment of the invention.
Figure 4:
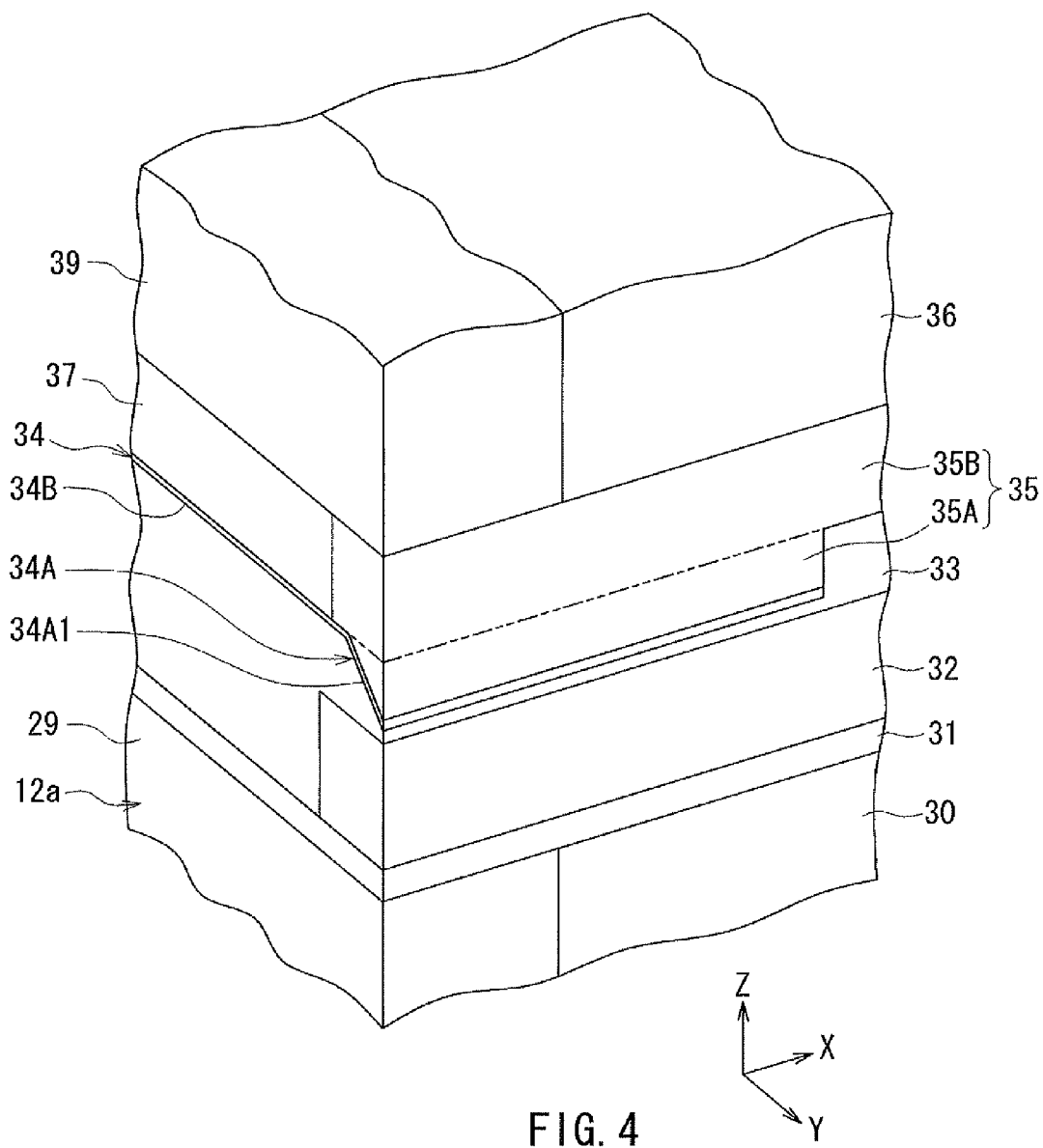
FIG. 4 is a perspective view showing the main part of the heat unit of a magnetic recording device according to the first embodiment of the invention.

The shapes and locations of the core 32, the plasmon generator 34, and the magnetic pole 35 will now be described in detail with reference to FIG. 1 to FIG. 4. FIG. 1 is a perspective view showing the core 32, the plasmon generator 34, and the magnetic pole 35. FIG. 2 is a front view showing a part of the medium facing surface 12a of the head unit 12. FIG. 3 is a cross-sectional view showing the core 32, the plasmon generator 34, and the magnetic pole 35. FIG. 4 is a perspective view showing the main part of the heat unit 12. Note that FIG. 1 illustrates an exploded view of the plasmon generator 34 and the magnetic pole 35.

Aside from the incident end 32a shown in FIG. 8, the core 32 further has: an end face 32b that is closer to the medium facing surface 12a; an evanescent light generating surface 32c, which is a top surface; a bottom surface 32d; and two side surfaces 32e and 32f, as shown in FIG. 1. The evanescent light generating surface 32c generates evanescent light based on the light propagated through the core 32. While FIG. 1 to FIG. 3 show an example where the end face 32b is located in the medium facing surface 12a, the end face 32b may be located away from the medium facing surface 12a.

As shown in FIG. 2, the clad layer 33 has a top surface 33a located above the core 32, and a groove 33b that opens in the top surface 33a and is located above the core 32. The groove 33b extends in the direction perpendicular to the medium facing surface 12a (X direction). The groove 33b is V-shaped in cross section parallel to the medium facing surface 12a.

As shown in FIG. 1 to FIG. 3, the plasmon generator 34 has an outer surface that includes a plasmon exciting part 341 and a front end face 342. The plasmon exciting part 341 faces the evanescent light generating surface 32c of the core 32 with a predetermined distance therebetween. The front end face 342 is located in the medium facing surface 12a. Surface plasmons are excited on the plasmon exciting part 341 through coupling with the evanescent light generated from the evanescent light generating surface 32c. As shown in FIG. 3, the clad layer 33 has a part interposed between the evanescent light generating surface 32c and the plasmon exciting part 341, the part of the clad layer 33 forming a buffer part 33A that has a refractive index lower than that of the core 32.

As shown in FIG. 1 and FIG. 2, the plasmon generator 34 has a V-shaped portion 34A that has an end face located in the medium facing surface 12a. The V-shaped portion 34A extends in the direction perpendicular to the medium facing surface 12a (X direction). The groove 33b mentioned above is to accommodate the V-shaped portion 34A.

The V-shaped portion 34A has a first sidewall part 34A1 and a second sidewall part 34A2 that are each connected to the plasmon exciting part 341, and that increase in distance from each other with increasing distance from the plasmon exciting part 341. The first and second sidewall parts 34A1 and 34A2 are each shaped like a plate. The first and second sidewall parts 34A1 and 34A2 are connected to each other so that the connected first and second sidewall parts 34A1 and 34A2 have a V-shaped cross section parallel to the medium facing surface 12a.

The plasmon generator 34 further has at least one extended portion that is connected to an edge of at least one of the first and second sidewall parts 34A1 and 34A2, the edge being opposite from the plasmon exciting part 341. In the present embodiment, the plasmon generator 34 has an extended portion 34B that is connected to the edge of the first sidewall part 34A1 opposite from the plasmon exciting part 341, and an extended portion 34C that is connected to the edge of the second sidewall part 34A2 opposite from the plasmon exciting part 341. From the edge of the first sidewall part 34A1 opposite from the plasmon exciting part 341, the extended portion 34B extends parallel to the evanescent light generating surface 32c and away from both the first and second sidewall parts 34A1 and 34A2 (−Y direction). From the edge of the second sidewall part 34A2 opposite from the plasmon exciting part 341, the extended portion 34C extends parallel to the evanescent light generating surface 32c and away from both the first and second sidewall parts 34A1 and 34A2 (Y direction). As viewed from above, the outer edges of the extended portions 34B and 34C lie outside the outer edges of the magnetic pole 35.

The plasmon exciting part 341 has a propagative edge 341a that lies at an end of the connected first and second sidewall parts 34A1 and 34A2 closer to the evanescent light generating surface 32c. In the example shown in FIG. 3, the entire plasmon exciting part 341 is composed of the propagative edge 341a. As will be described later, the propagative edge 341a propagates plasmons. In a cross section parallel to the medium facing surface 12a, the propagative edge 341a may have the shape of a perfectly pointed edge whereas it may have an arc shape in a microscopic view.

The front end face 342 has a first portion 342a and a second portion 342b that lie at respective ends of the first and second sidewall parts 34A1 and 34A2 and are connected to each other into a V-shape, a third portion 342c that lies at an end of the extended portion 34B, a fourth portion 342d that lies at an end of the extended portion 34C, and a near-field light generating edge 342e that lies at an end of the plasmon exciting part 341 (propagative edge 341a). The near-field light generating edge 342e generates near-field light based on the surface plasmons excited on the plasmon exciting part 341. The near-field light generating edge 342e may have the shape of a perfectly pointed edge whereas it may have an arc shape in a microscopic view.

The magnetic pole 35 has a first portion 35A and a second portion 35B. The first portion 35A is accommodated in the space formed by the V-shaped portion 34A (the first and second sidewall parts 34A1 and 34A2) of the plasmon generator 34. The second portion 35B is located farther from the evanescent light generating surface 32c of the core 32 than is the first portion 35A. In FIG. 1 to FIG. 4, the border between the first portion 35A and the second portion 35B is shown by a chain double-dashed line.

The first portion 35A is triangular-prism-shaped. The first portion 35A is interposed between the first and second sidewall parts 34A1 and 34A2 of the V-shaped portion 34A of the plasmon generator 34, and is in contact with the first and second sidewall parts 34A1 and 34A2. The first portion 35A has a constant width in a direction parallel to the medium facing surface 12a and the evanescent light generating surface 32c (Y direction) regardless of the distance from the medium facing surface 12a.

As shown in FIG. 1, the second portion 35B has a front part 35B1 and a rear part 35B2. The front part 35B1 has an end face located in the medium facing surface 12a. The rear part 35B2 is connected to an end of the front part 35B1 opposite from the medium facing surface 12a. The front part 35B1 has a constant width in the direction parallel to the medium facing surface 12a and the evanescent light generating surface 32c (Y direction) regardless of the distance from the medium facing surface 12a, the width being greater than that of the first portion 35A. The width of the rear part 35B2 in the direction parallel to the medium facing surface 12a and the evanescent light generating surface 32c (Y direction) is equal to that of the front part 35B1 at the border with the front part 35B1, and increases with increasing distance from the medium facing surface 12a.

As shown in FIG. 1 and FIG. 2, the magnetic pole 35 has an end face 351 located in the medium facing surface 12a. The end face 351 includes a first portion 351a and a second portion 351b. The first portion 351a is the end face of the first portion 35A. The second portion 351b is the end face of the second portion 35B. The second portion 351b is also the end face of the front part 35B1. The first portion 351a has a triangular shape and is interposed between the first and second portions 342a and 342b of the front end face 342 of the plasmon generator 34. The first portion 351a has a tip 351c located at its bottom end.

As shown in FIG. 1, the width of the core 32 in the track width direction TW (Y direction) in the vicinity of the plasmon generator 34 will be represented by the symbol $W_{WG}$. The thickness (dimension in the Z direction) of the core 32 in the vicinity of the plasmon generator 34 will be represented by the symbol $T_{WG}$. $W_{WG}$ falls within the range of 0.3 to 100 µm, for example. $T_{WG}$ falls within the range of 0.1 to 4 µm, for example. As shown in FIG. 9, the core 32 excluding the part in the vicinity of the plasmon generator 34 may have a width greater than $W_{WG}$. In the example shown in FIG. 9, the core 32 excluding the part in the vicinity of the plasmon generator 34 has a width of 4 µm.

As shown in FIG. 1, the dimension of the first and second portions 342a and 342b of the front end face 342 of the plasmon generator 34 in the track width direction TW (Y direction) will be represented by the symbol $W_{PGA}$. The dimension of the first and second portions 342a and 342b in the Z direction will be represented by the symbol $T_{PG}$. Both $W_{PGA}$ and $T_{PG}$ are sufficiently smaller than the wavelength of the laser light to be propagated through the core 32. The dimension of the first and second sidewall parts 34A1 and 34A2 in a direction perpendicular to the evanescent light generating surface 32c (Z direction) is equal to $T_{PG}$. $T_{PG}$ preferably falls within the range of 200 to 400 nm. The reason will be detailed later.

$W_{PGA}$ is determined by $T_{PG}$ and the angle θ formed between the two surfaces of the V-shaped portion 34A on opposite sides in the track width direction TW (see FIG. 2). More specifically, $W_{PGA}=2\times T_{PG}\times\tan(\theta/2)$. The angle θ preferably falls within the range of 30 to 120 degrees.

As shown in FIG. 1, the widths of the third portion 342c and the fourth portion 342d of the front end face 342 of the plasmon generator 34 in the track width direction TW (Y direction) will be represented by the symbols $W_{PGB}$ and $W_{PGC}$, respectively. In the present embodiment, $W_{PGB}$ and $W_{PGC}$ are equal. $W_{PGB}$ and $W_{PGC}$ fall within the range of 0.5 to 20 µm, for example. In FIG. 1, the extended portions 34B and 34C are depicted as having a width greater than $W_{PGB}$ and $W_{PGC}$ in positions away from the medium facing surface 12a. However, the extended portions 34B and 34C may each have a constant width regardless of the distance from the medium facing surface 12a.

As shown in FIG. 3, the length of the plasmon generator 34 in the X direction will be represented by the symbol $H_{PG}$. $H_{PG}$ falls within the range of 0.6 to 4.0 µm, for example. The X-direction length of a portion of the plasmon exciting part 341 of the plasmon generator 34, the portion being opposed to the evanescent light generating surface 32c, will be represented by the symbol $H_{BF}$. The distance between the plasmon exciting part 341 and the evanescent light generating surface 32c will be represened by the symbol $T_{BF}$. Both $H_{BF}$ and $T_{BF}$ are important parameters in achieving appropriate excitation and propagation of surface plasmons. $H_{BF}$ preferably falls within the range of 0.6 to 4.0 µm, and is preferably greater than the wavelength of the laser light to be propagated through the core 32. In the example shown in FIG. 3, the end face 32b of the core 32 is located in the medium facing surface 12a, so that $H_{BF}$ is equal to $H_{PG}$. $T_{BF}$ preferably falls within the range of 10 to 100 nm. As shown in FIG. 2, the distance between the near-field light generating edge 342e of the front end face 342 of the plasmon generator 34 and the end face 32b of the core 32 is equal to $T_{BF}$.

As shown in FIG. 2, the distance between the near-field light generating edge 342e of the front end face 342 of the plasmon generator 34 and the tip 351c of the first portion 351a of the end face 351 of the magnetic pole 35 will be represented by the symbol $D_1$. The dimension of the front end face 342 on a virtual straight line L is equal to $D_1$, the virtual straight line L passing through the near-field light generating edge 342e and extending in the direction perpendicular to the evanescent light generating surface 32c. $D_1$ preferably falls within the range of 20 to 70 nm. The reason will be detailed later.

As shown in FIG. 3, the distance between the medium facing surface 12a and the end face of the coupling layer 36 closer to the medium facing surface 12a will be represented by the symbol $H_{PD}$. $H_{PD}$ falls within the range of 0.3 to 1.0 µm, for example.

Reference is now made to FIG. 3 to describe the principle of generation of near-field light in the present embodiment and the principle of thermally-assisted magnetic recording using the near-field light. Laser light 46 emitted from the laser diode 60 is propagated through the core 32 of the waveguide to reach the vicinity of the plasmon generator 34. Here, the laser light 46 is totally reflected at the evanescent light generating surface 32c which is the interface between the core 32 and the buffer part 33A. This generates evanescent light 47 permeating into the buffer part 33A. Then, the evanescent light 47 and fluctuations of charges on the plasmon exciting part 341 (propagative edge 341a) of the outer surface of the plasmon generator 34 are coupled with each other to induce a surface plasmon polariton mode. In this way, surface plasmons are excited on the plasmon exciting part 341 (propagative edge 341a) through coupling with the evanescent light 47 generated from the evanescent light generating surface 32c.

The surface plasmons excited on the plasmon exciting part 341 (propagative edge 341a) of the outer surface of the plasmon generator 34 are transformed into edge plasmons to propagate along the propagative edge 341a to the near-field light generating edge 342e. Consequently, the edge plasmons concentrate at the near-field light generating edge 342e, and near-field light 48 occurs from the near-field light generating edge 342e based on the edge plasmons. The near-field light 48 is projected toward the magnetic disk 201, reaches the surface of the magnetic disk 201, and heats a part of the magnetic recording layer of the magnetic disk 201. This lowers the coercivity of the part of the magnetic recording layer. In thermally-assisted magnetic recording, the part of the magnetic recording layer with the lowered coercivity is subjected to a write magnetic field produced by the magnetic pole 35 for data writing.

Figure 10:
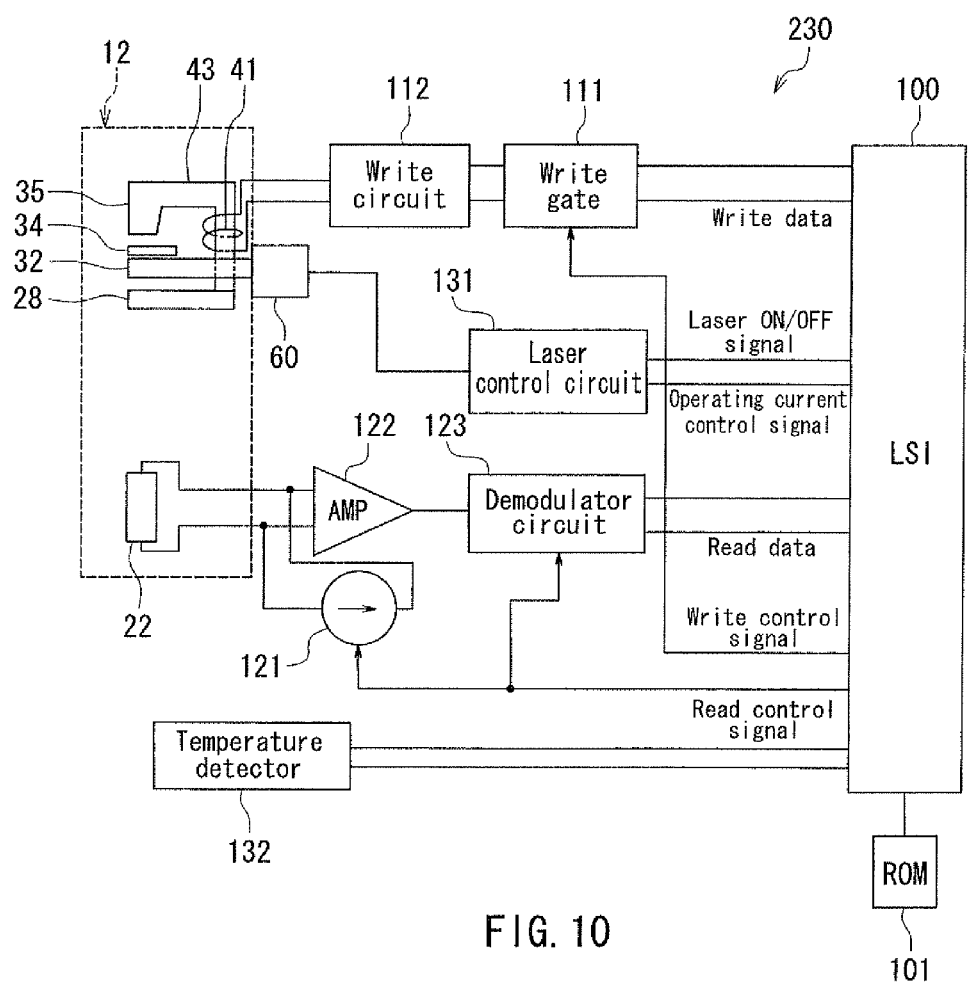
FIG. 10 is a block diagram showing the circuit configuration of the magnetic recording device according to the first embodiment of the invention.

Reference is now made to FIG. 10 to describe the circuit configuration of the control circuit 230 shown in FIG. 5 and the operation of the thermally-assisted magnetic recording head 1. The control circuit 230 includes a control LSI (large scale integrated circuit) 100, a ROM (read only memory) 101 connected to the control LSI 100, a write gate 111 connected to the control LSI 100, and a write circuit 112 connected to the write gate 111 and the coil 40.

The control circuit 230 further includes a constant current circuit 121 connected to the MR element 22 and the control LSI 100, an amplifier 122 connected to the MR element 22, and a demodulator circuit 123 connected to an output of the amplifier 122 and the control LSI 100.

The control circuit 230 further includes a laser control circuit 131 connected to the laser diode 60 and the control LSI 100, and a temperature detector 132 connected to the control LSI 100.

The control LSI 100 supplies write data and a write control signal to the write gate 111. The control LSI 100 supplies a read control signal to the constant current circuit 121 and the demodulator circuit 123, and receives read data output from the demodulator circuit 123. The control LSI 100 supplies a laser ON/OFF signal and an operating current control signal to the laser control circuit 131. The temperature detector 132 detects the temperature of the magnetic recording layer of the magnetic disk 201, and supplies this temperature information to the control LSI 100. The ROM 101 contains a control table and the like for controlling the value of the operating current to be supplied to the laser diode 60.

In a write operation, the control LSI 100 supplies write data to the write gate 111. The write gate 111 supplies the write data to the write circuit 112 only when the write control signal indicates a write operation. According to the write data, the write circuit 112 passes a write current through the coil 40. Consequently, the magnetic pole 35 produces a write magnetic field and data is written on the magnetic recording layer of the magnetic disk 201 through the use of the write magnetic field.

In a read operation, the constant current circuit 121 supplies a certain sense current to the MR element 22 only when the read control signal indicates a read operation. The output voltage of the MR element 22 is amplified by the amplifier 122 and input to the demodulator circuit 123. When the read control signal indicates a read operation, the demodulator circuit 123 demodulates the output of the amplifier 122 to generate read data, and supplies the read data to the control LSI 100.

The laser control circuit 131 controls the supply of the operating current to the laser diode 60 on the basis of the laser ON/OFF signal, and also controls the value of the operating current to be supplied to the laser diode 60 on the basis of the operating current control signal. When the laser ON/OFF signal indicates an ON operation, the laser control circuit 131 exercises control so that an operating current at or above an oscillation threshold is supplied to the laser diode 60. Consequently, the laser diode 60 emits laser light, and the laser light is propagated through the core 32. According to the principle of generation of near-field light described previously, the near-field light 48 occurs from the near-field light generating edge 342e of the plasmon generator 34. The near-field light 48 heats a part of the magnetic recording layer of the magnetic disk 201, thereby lowering the coercivity of that part. When writing, the part of the magnetic recording layer with the lowered coercivity is subjected to the write magnetic field produced by the magnetic pole 35 for performing data writing.

On the basis of such factors as the temperature of the magnetic recording layer of the magnetic disk 201 measured by the temperature detector 132, the control LSI 100 consults the control table stored in the ROM 101 to determine the value of the operating current of the laser diode 60. Using the operating current control signal, the control LSI 100 controls the laser control circuit 131 so that the operating current of that value is supplied to the laser diode 60. The control table contains, for example, data that indicates the oscillation threshold and the temperature dependence of the light output versus operating current characteristic of the laser diode 60.

The control table may further contain data that indicates the relationship between the operating current value and a temperature increase of the magnetic recording layer heated by the near-field light 48, and data that indicates the temperature dependence of the coercivity of the magnetic recording layer.

As shown in FIG. 10, the control circuit 230 has the signal system for controlling the laser diode 60, i.e., the signal system consisting of the laser ON/OFF signal and the operating current control signal, independent of the control signal system intended for read/write operations. This configuration makes it possible to implement various modes of energization of the laser diode 60, not only to energize the laser diode 60 simply in association with a write operation. It should be noted that the circuit configuration of the control circuit 230 is not limited to the one shown in FIG. 10.

Now, a method of manufacturing the slider 10 of the present embodiment will be described briefly. The method of manufacturing the slider 10 includes the steps of forming components of a plurality of sliders 10 other than the slider substrates 11 on a substrate that includes portions to become the slider substrates 11 of the plurality of sliders 10, thereby fabricating a substructure that includes a plurality of rows of pre-slider portions, the pre-slider portions being intended to become the sliders 10 later; and forming the plurality of sliders 10 by cutting the substructure to separate the plurality of pre-slider portions from each other. In the step of forming the plurality of sliders 10, the surfaces formed by the cutting are polished into the medium facing surfaces 11a and 12a.

Reference is now made to FIG. 11 to FIG. 15 to describe an example of the method of forming the plasmon generator 34 and the magnetic pole 35. FIG. 11 to FIG. 15 each show a part of a stack of layers fabricated in the process of forming the plasmon generator 34 and the magnetic pole 35. FIG. 11 to FIG. 15 each show a cross section in the position where the medium facing surface 12a is to be formed.

Figure 11:
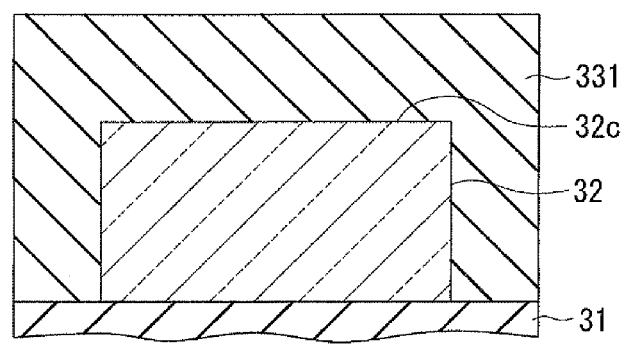
FIG. 11 is a cross-sectional view showing a step of a method of forming the plasmon generator and the magnetic pole of the first embodiment of the invention.

FIG. 11 shows a step of the method of forming the plasmon generator 34 and the magnetic pole 35. In this step, the core 32 of the waveguide is initially formed on the clad layer 31 and then a dielectric layer 331 is formed to cover the clad layer 31 and the core 32. The dielectric layer 331 is made of the same material as that of the clad layer 33.

Figure 12:
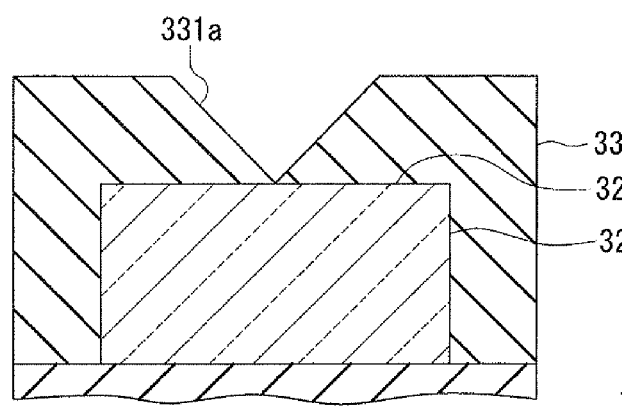
FIG. 12 is a cross-sectional view showing a step that follows the step shown in FIG. 11.

FIG. 12 shows the next step. In this step, an etching mask is initially formed on the dielectric layer 331. The etching mask has an opening that has a shape corresponding to the planar shape of the V-shaped portion 34A of the plasmon generator 34 to be formed later. Using the etching mask, the dielectric layer 331 is then etched by reactive ion etching or ion milling, for example. A V-shaped groove 331a is thereby formed in the dielectric layer 331. The groove 331a is formed so that its bottom end reaches the evanescent light generating surface 32c of the core 32. The etching mask is then removed.

Figure 13:
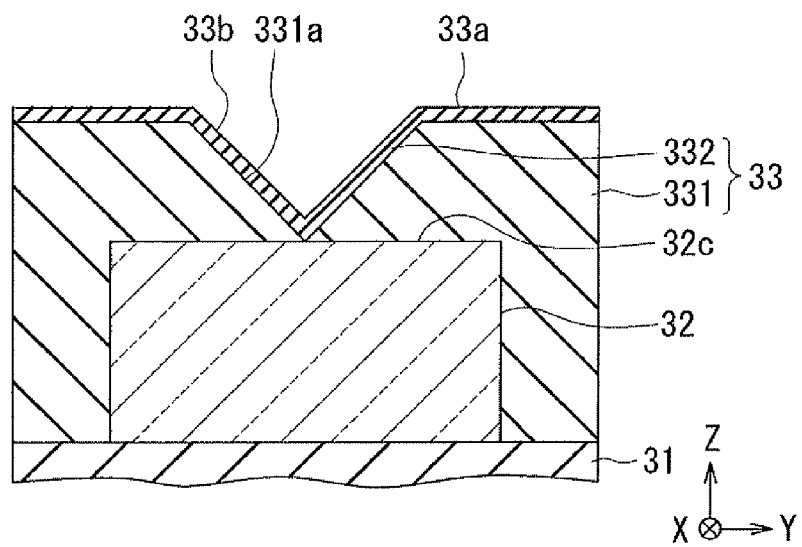
FIG. 13 is a cross-sectional view showing a step that follows the step shown in FIG. 12.

FIG. 13 shows the next step. In this step, a dielectric film 332 is formed by, for example, sputtering, so as to cover the entire top surface of the stack shown in FIG. 12. The dielectric film 332 is made of the same material as that of the clad layer 33. The dielectric film 332 is formed also in the groove 331a. The dielectric layer 331 and the dielectric film 332 constitute the clad layer 33. The groove 33b of the clad layer 33 has a depth (dimension in the Z direction) of 200 nm, for example.

Figure 14:
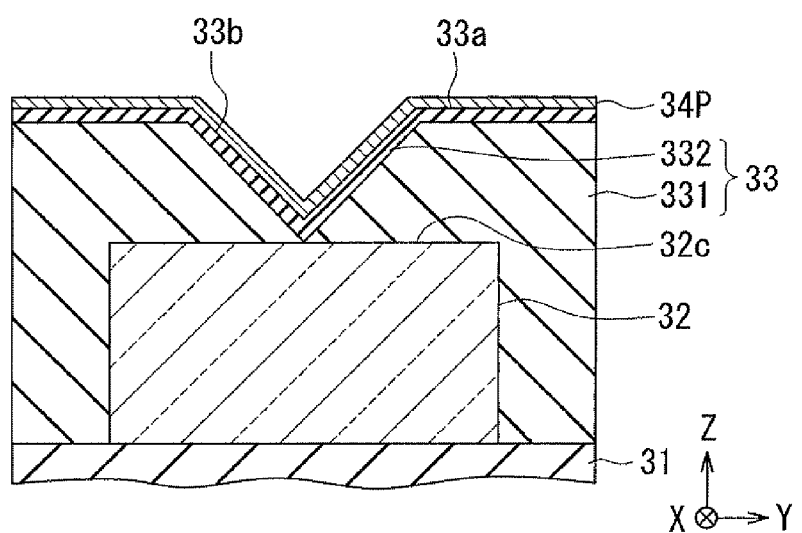
FIG. 14 is a cross-sectional view showing a step that follows the step shown in FIG. 13.

FIG. 14 shows the next step. In this step, a metal film 34P is formed by, for example, sputtering, so as to cover the entire top surface of the stack shown in FIG. 13. The metal film 34P is to become the plasmon generator 34 later.

Figure 15:
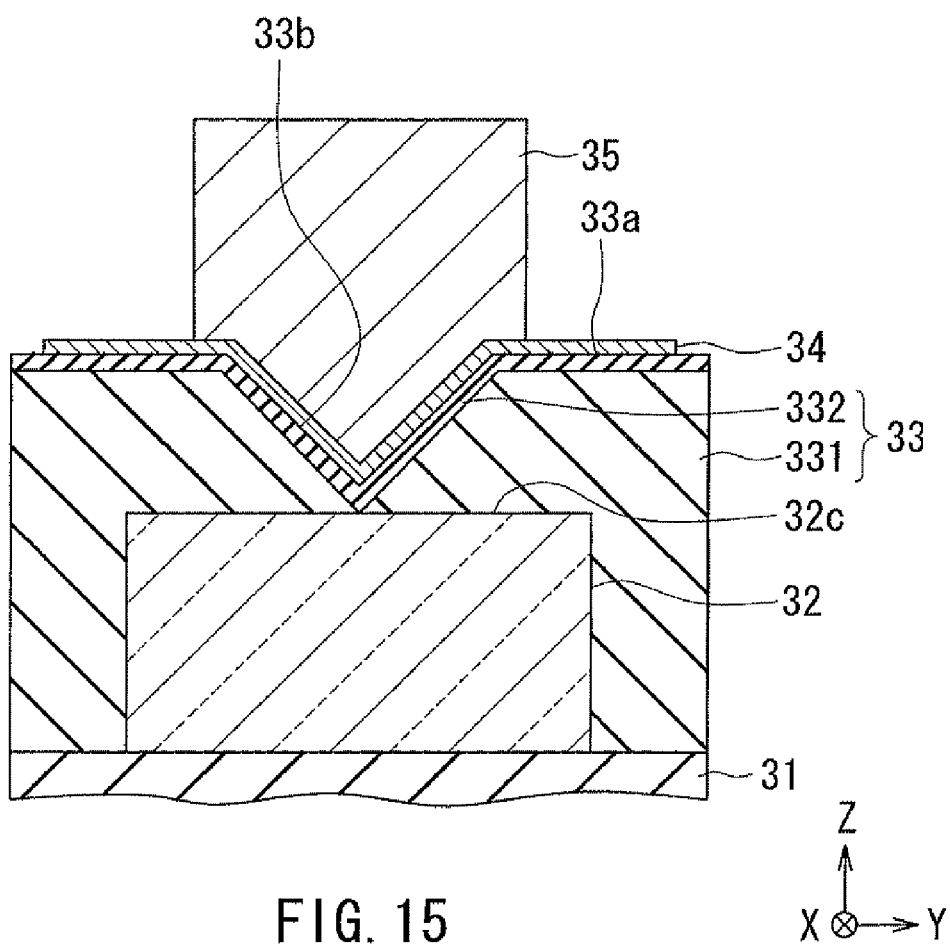
FIG. 15 is a cross-sectional view showing a step that follows the step shown in FIG. 14.

FIG. 15 shows the next step. In this step, the metal film 34P is initially patterned by etching a part of the metal film 34P by ion milling, for example. As a result, the remaining metal film 34P becomes the plasmon generator 34. Next, the magnetic pole 35 is formed on the plasmon generator 34 by frame plating, for example. The thickness of the magnetic pole 35 (the distance between the bottom end of the groove 33b and the top surface of the magnetic pole 35) is greater than the depth of the groove 33b. For example, if the depth of the groove 33b is 200 nm, the thickness of the magnetic pole 35 is 450 nm.

When the foregoing substructure is completed, the substructure is cut near the positions where the medium facing surfaces 12a are to be formed, so that the plurality of pre-slider portions are separated from each other. Subsequently, the surfaces formed by the cutting are polished into the medium facing surfaces 12a.

The effects of the thermally-assisted magnetic recording head 1 according to the present embodiment will now be described. The outer surface of the plasmon generator 34 of the present embodiment includes the plasmon exciting part 341 and the front end face 342. The plasmon exciting part 341 faces the evanescent light generating surface 32c of the core 32 with a predetermined distance therebetween. The front end face 342 is located in the medium facing surface 12a. The front end face 342 has the near-field light generating edge 342e lying at an end of the plasmon exciting part 341. Surface plasmons are excited on the plasmon exciting part 341 through coupling with the evanescent light that occurs from the evanescent light generating surface 32c. The near-field light generating edge 342e generates near-field light based on the surface plasmons excited on the plasmon exciting part 341.

According to the present embodiment, it is possible to transform the laser light that is propagated through the core 32 into near-field light with higher efficiency, as compared with the conventional technique of directly irradiating a plasmon antenna with laser light to produce near-field light from the plasmon antenna.

In the present embodiment, the plasmon generator 34 has the V-shaped portion 34A and the extended portions 34B and 34C. The V-shaped portion 34A has the first and second sidewall parts 34A1 and 34A2. The front end face 342 of the plasmon generator 34 includes the first and second portions 342a and 342b lying at the respective ends of the first and second sidewall parts 34A1 and 34A2, the third portion 342C lying at the end of the extended portion 34B, and the fourth portion 342d lying at the end of the extended portion 34C. The extended portions 34B and 34C have a heat sink function of dissipating heat from the plasmon generator 34 to outside. More specifically, according to the present embodiment, the outer surface of the plasmon generator 34 in contact with air and other components of the thermally-assisted magnetic head can be increased in area as much as the extended portions 34B and 34C as compared with a case where the plasmon generator 34 does not have the extended portions 34B and 34C. Consequently, according to the present embodiment, the heat generated in the plasmon generator 34 can be more effectively dissipated to outside. The present embodiment thus makes it possible to suppress a rise in temperature of the plasmon generator 34. This effect will be detailed below.

The outer surface of the plasmon generator 34 includes the front end face 342, which is exposed in the medium facing surface 12a and is in contact with air. When the thermally-assisted magnetic recording head is in use, the heat of the plasmon generator 34 is dissipated at the medium facing surface 12a by the airflow that passes between the medium facing surface 12a and the magnetic disk 201. According to the present embodiment, the front end face 342 of the plasmon generator 34 in contact with air is increased in area as much as the extended portions 34B and 34C, i.e., as much as the third and fourth portions 342c and 342d, as compared with the case where the plasmon generator 34 does not have the extended portions 34B and 34C. The present embodiment thus promotes the heat dissipation from the plasmon generator 34 by means of the airflow mentioned above, and consequently makes it possible to suppress a rise in temperature of the plasmon generator 34.

Portions of the outer surface of the plasmon generator 34 other than the front end face 342 are in contact with other components of the thermally-assisted magnetic head. In such portions, the heat generated in the plasmon generator 34 is dissipated from the plasmon generator 34 by conduction to other components. According to the present embodiment, the portions of the outer surface of the plasmon generator 34 other than the front end face 342 are increased in area as compared with the case where the plasmon generator 34 does not have the extended portions 34B and 34C. The present embodiment thus promotes the heat dissipation from the plasmon generator 34 by the conduction of the heat generated in the plasmon generator 34 to other components, and consequently makes it possible to suppress a rise in temperature of the plasmon generator 34.

In the present embodiment, in particular, the magnetic pole 35 is in contact with the plasmon generator 34. The magnetic pole 35 is also in contact with the top yoke layer 43 of high volume via the coupling layer 36. The magnetic pole 35 is made of a magnetic metal material which is higher in thermal conductivity than insulating materials such as alumina. Consequently, according to the present embodiment, the heat generated in the plasmon generator 34 can be effectively dissipated through the magnetic pole 35, the coupling layer 36, and the top yoke layer 43 with a significant effect of suppressing a rise in temperature of the plasmon generator 34. In the present embodiment, as viewed from above, the outer edges of the extended portions 34B and 34C of the plasmon generator 34 lie outside the outer edges of the magnetic pole 35. This makes it possible to make the extended portions 34B and 34C large without being restricted by the width of the magnetic pole 35, so that it is possible to promote the heat dissipation from the plasmon generator 34.

From the foregoing, according to the present embodiment, it is possible to prevent the front end face 342 of the plasmon generator 34 from protruding from the medium facing surface 12a due to an excessive rise in temperature of the plasmon generator 34, and to prevent a reduction in use efficiency of the light in the plasmon generator 34.

Now, a description will be given of the results of a first simulation demonstrating that the present embodiment makes it possible to suppress a rise in temperature of the plasmon generator 34. In the first simulation, two models of thermally-assisted magnetic recording heads to be described later, namely, a model of a comparative example and a model of a practical example, were measured for the following temperatures: the temperature at the near-field light generating edge 342e of the front end face 342 of the plasmon generator 34 (hereinafter, referred to as the temperature of the plasmon generator 34); and the temperature of the evanescent light generating surface 32c of the core 32 at the portion opposed to the near-field light generating edge 342e (hereinafter, referred to as the temperature of the core 32).

The plasmon generator 34 of the model of the comparative example is without the extended portions 34B and 34C. The plasmon generator 34 of the model of the practical example has the extended portions 34B and 34C. In the model of the practical example, $W_{PGB}$ and $W_{PGC}$ shown in FIG. 1 are 5 μm.

For the first simulation, Au was selected as the material of the plasmon generator 34. $T_{PG}$ shown in FIG. 1 was set to 200 nm, θ shown in FIG. 2 was set to 90 degrees, and $H_{PG}$ shown in FIG. 3 was set to 1.2 μm. $T_{BF}$ shown in FIG. 2 and FIG. 3 was set to 35 nm, $D_1$ shown in FIG. 2 was set to 30 nm, and $H_{PD}$ shown in FIG. 3 was set to 0.5 μm. Energy for the plasmon generator 34 to be transformed into heat per second was set to 8.3 mW.

Table 1 shows the results of the first simulation. From Table 1, it can be seen that both the temperature of the plasmon generator 34 and that of the core 32 are lower in the model of the practical example than in the model of the comparative example. The reason is considered to be that in the model of the practical example, the extended portions 34B and 34C promote the heat dissipation from the plasmon generator 34 as compared with the model of the comparative example.

TABLE 1

|  | Temperature of the core 32 (° C.) | Temperature of the plasmon generator 34 (° C.) |
| --- | --- | --- |
| Model of comparative example | 132 | 234 |
| Model of practical example | 103 | 179 |

As can be seen from the results of the first simulation, according to the present embodiment, the heat dissipation from the plasmon generator 34 is promoted by the extended portions 34B and 34C as compared with the case where the plasmon generator 34 does not have the extended portions 34B and 34C. The present embodiment thus makes it possible to suppress a rise in temperature of the plasmon generator 34.

The other effects of the present embodiment will now be described. In the present embodiment, the plasmon generator 34 made of a metal is in contact with the magnetic pole 35 made of a magnetic metal material. The plasmon generator 34 is thus not electrically isolated. According to the present embodiment, it is therefore possible to avoid the occurrence of electrical static discharge (ESD) in the plasmon generator 34.

In the present embodiment, the magnetic pole 35 is disposed such that the plasmon generator 34 is interposed between the magnetic pole 35 and the core 32. With such a configuration, according to the present embodiment, the end face 351 of the magnetic pole 35 for generating the write magnetic field and the near-field light generating edge 342e of the plasmon generator 34 for generating the near-field light can be put close to each other in the medium facing surface 12a. This makes it possible to implement an advantageous configuration for thermally-assisted magnetic recording. Moreover, according to the present embodiment, since the plasmon generator 34 made of a nonmagnetic metal is interposed between the core 32 and the magnetic pole 35, it is possible to prevent the laser light propagated through the core 32 from being absorbed by the magnetic pole 35. This can improve the use efficiency of the laser light propagated through the core 32.

In the present embodiment, the first and second sidewall parts 34A1 and 34A2 are each connected to the plasmon exciting part 341, and increase in distance from each other with increasing distance from the plasmon exciting part 341. The magnetic pole 35 has the first portion 35A interposed between the first and second sidewall parts 34A1 and 34A2. The front end face 342 of the plasmon generator 34 has the first and second portions 342a and 342b that are connected to each other into a V-shape. The end face 351 of the magnetic pole 35 located in the medium facing surface 12a has a triangular portion interposed between the first and second portions 342a and 342b of the front end face 342, that is, the first portion 351a. The first portion 351a has the tip 351c located at its bottom end. In the first portion 351a, the tip 351c is closest to the bottom shield layer 29. Magnetic fluxes therefore concentrate at the vicinity of the tip 351c of the first portion 351a, so that a high write magnetic field occurs from the vicinity of the tip 351c. Consequently, according to the present embodiment, the position where a high write magnetic field occurs in the first portion 351a can be brought closer to the near-field light generating edge 342e of the plasmon generator 34 which generates near-field light. According to the present embodiment, it is thus possible to put the position of occurrence of the write magnetic field and the position of occurrence of the near-field light close to each other while preventing the laser light propagated through the core 32 from being absorbed by the magnetic pole 35.

Now, a description will be given of the results of a second simulation demonstrating that the present embodiment makes it possible to locate the position of occurrence of the write magnetic field and the position of occurrence of the near-field light close to each other. Initially, two types of models of thermally-assisted magnetic recording heads used in the second simulation, namely, a model of a first type and a model of a second type, will be described with reference to FIG. 16 and FIG. 17.

Figure 16:
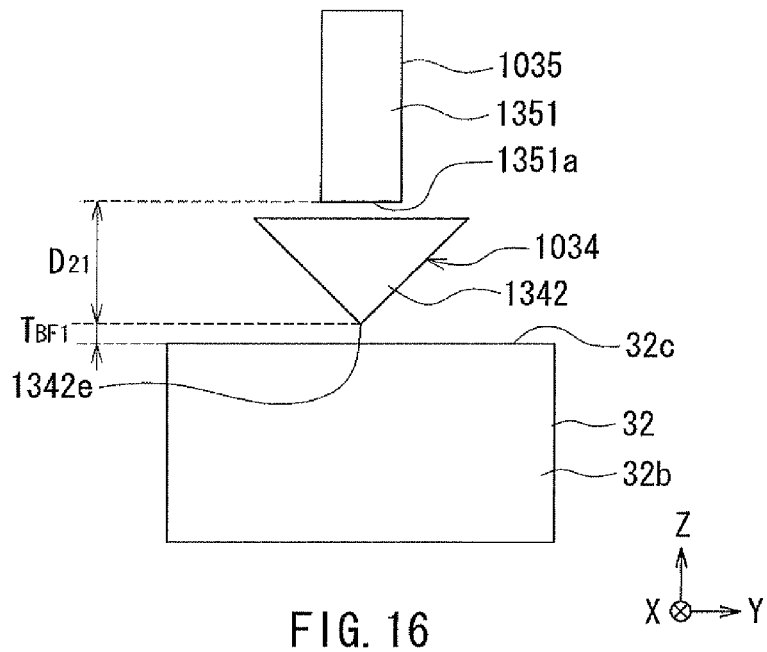
FIG. 16 is a front view showing a core, a plasmon generator, and a magnetic pole in a medium facing surface of a model of a first type used in a second simulation.

FIG. 16 is a front view showing a core, a plasmon generator, and a magnetic pole in the medium facing surface of the model of the first type. As shown in FIG. 16, the model of the first type includes a plasmon generator 1034 and a magnetic pole 1035, instead of the plasmon generator 34 and the magnetic pole 35 of the embodiment. The plasmon generator 1034 is triangular-prism-shaped. The outer surface of the plasmon generator 1034 includes a propagative edge and a front end face 1342. The propagative edge faces the evanescent light generating surface 32c of the core 32 with a predetermined distance therebetween. The front end face 1342 has a triangular shape. The front end face 1342 has a near-field light generating edge 1342e lying at an end of the above-mentioned propagative edge.

The magnetic pole 1035 does not include any portion corresponding to the first portion 35A of the magnetic pole 35 of the embodiment. The magnetic pole 1035 is located on a side of the plasmon generator 1034 opposite from the core 32, at a predetermined distance from the plasmon generator 1034. The magnetic pole 1035 has an end face 1351 located in the medium facing surface 12a. The end face 1351 has a rectangular shape. The end face 1351 has a bottom end 1351a that is closer to the evanescent light generating surface 32c of the core 32.

Figure 17:
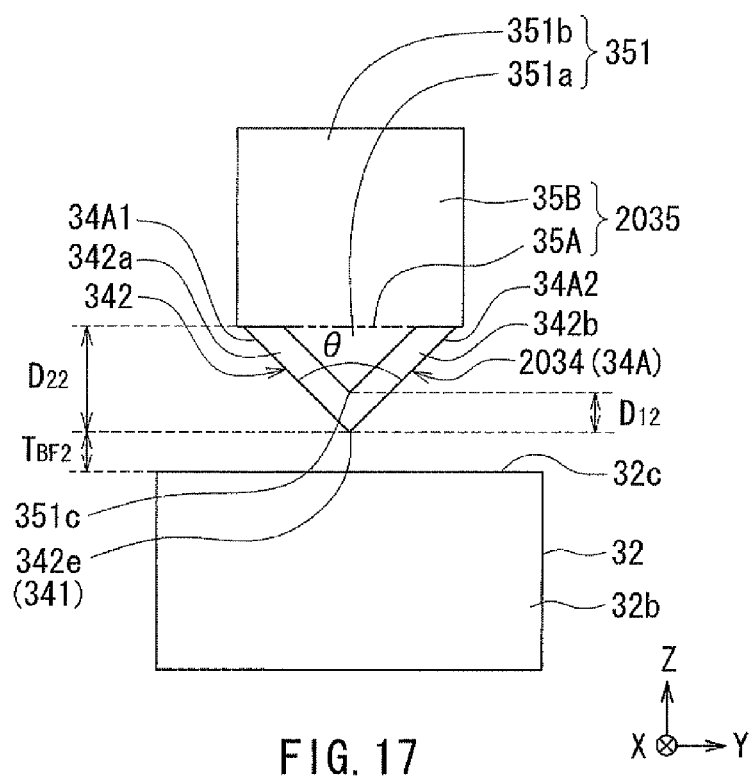
FIG. 17 is a front view showing a core, a plasmon generator, and a magnetic pole in a medium facing surface of a model of a second type used in the second simulation.

FIG. 17 is a front view showing a core, a plasmon generator, and a magnetic pole in the medium facing surface of the model of the second type. As shown in FIG. 17, the model of the second type includes a plasmon generator 2034 and a magnetic pole 2035, instead of the plasmon generator 34 and the magnetic pole 35 of the embodiment. The plasmon generator 2034 has the same configuration as that of the plasmon generator 34 of the embodiment except that there is no extended portion 34B or 34C. The magnetic pole 2035 has the same configuration as that of the magnetic pole 35 of the embodiment. Hereinafter, substantially the same components as in the embodiment will be designated by like reference numerals for description. The outer surface of the plasmon generator 2034 includes a plasmon exciting part 341 and a front end face 342. The plasmon generator 2034 has a V-shaped portion 34A. The V-shaped portion 34A has first and second sidewall parts 34A1 and 34A2. The front end face 342 has first and second portions 342a and 342b and a near-field light generating edge 342e. In the model of the second type, the front end face 342 does not have the third and fourth portions 342c and 342d of the embodiment.

The magnetic pole 2035 has first and second portions 35A and 35B. The magnetic pole 2035 also has an end face 351. The end face 351 has a first portion 351a and a second portion 351b. The first portion 351a has a tip 351c. In FIG. 17, the border between the first portion 35A (the first portion 351a) and the second portion 35B (the second portion 351b) is shown by a chain double-dashed line.

The model of the second type is a model for showing the relationship between the position of occurrence of the write magnetic field and the position of occurrence of the near-field light according to the embodiment. The plasmon generator 2034 of the second type does not include the extended portions 34B and 34C because the second simulation is not concerned with the extended portions 34B and 34C.

The conditions of the second simulation will now be described. For the second simulation, FeCo was selected as the material of the magnetic poles 1035 and 2035. The lengths of the plasmon generators 1034 and 2034 and those of the magnetic poles 1035 and 2035 in the X direction were each set to 3 μm. The length of the top yoke layer 43 in the X direction was set to 12 μm. The dimension of the top yoke layer 43 in the track width direction TW (Y direction) was set to 17 μm (see FIG. 9).

For the model of the first type, as shown in FIG. 16, the distance between the near-field light generating edge 1342e of the front end face 1342 of the plasmon generator 1034 and the end face 32b of the core 32 will be represented by the symbol $T_{BF1}$. The distance between the near-field light generating edge 1342e and the bottom end 1351a of the end face 1351 of the magnetic pole 1035 will be represented by the symbol $D_{21}$. For the second simulation, $T_{BF1}$ was set to 50 nm, and $D_{21}$ was set to 120 nm.

For the model of the second type, as shown in FIG. 17, the distance between the near-field light generating edge 342e of the front end face 342 of the plasmon generator 1034 and the end face 32b of the core 32 will be represented by the symbol $T_{BF2}$. The distance between the near-field light generating edge 342e and the tip 351c will be represented by the symbol $D_{12}$. The distance between the near-field light generating edge 342e and the second portion 351b will be represented by the symbol $D_{22}$. $D_{22}$ is equal to the dimension $T_{PG}$ of the first and second sidewall parts 34A1 and 34A2 in the Z direction (see FIG. 1). For the second simulation, $T_{BF2}$ was set to 50 nm, $D_{12}$ was set to 50 nm, and $D_{22}$ was set to 120 nm. The angle θ formed between the two surfaces of the V-shaped portion 34A on opposite sides in the track width direction (Y direction) was set to 75 degrees.

In the second simulation, an effective write magnetic field $H_{eff}$ was determined for both the model of the first type and the model of the second type. The effective write magnetic field refers to a write magnetic field that the magnetic pole effectively exerts on the magnetic recording layer of the magnetic disk 201 so that the magnetization of the magnetic recording layer is inverted to form a recording bit. The effective write magnetic field $H_{eff}$ is expressed by the following equation:

$$H_{eff} = \{(H_P^2 + H_T^2)^{1/3} + H_L^{2/3}\}^{3/2},$$

where $H_P$ is the component of the write magnetic field in a direction perpendicular to the magnetic recording layer (X direction), $H_T$ is the component in the track width direction (Y direction), and $H_L$ is the component in a track-extending direction (Z direction).

Figure 18:
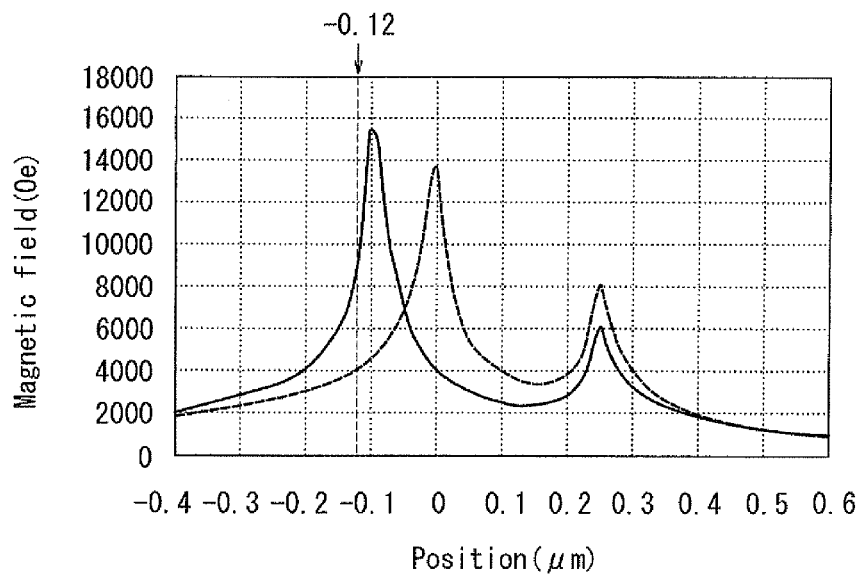
FIG. 18 is a characteristic chart showing the effective write magnetic field determined by the second simulation.

The results of the second simulation will now be described with reference to FIG. 18. FIG. 18 is a characteristic chart showing the effective write magnetic field $H_{eff}$ determined by the second simulation. In FIG. 18, the horizontal axis shows the position on the medium facing surface 12a in the track-extending direction (Z direction). The vertical axis shows the effective write magnetic field $H_{eff}$. The unit of $H_{eff}$ is Oe (1 Oe=79.6 A/m). In FIG. 18, the broken line shows the effective write magnetic field $H_{eff}$ of the model of the first type, and the solid line shows the effective write magnetic field $H_{eff}$ of the model of the second type.

On the horizontal axis of FIG. 18, 0 μm indicates the position of the bottom end 1351a of the end face 1351 of the magnetic pole 1035 of the model of the first type and the position of the border between the first portion 351a and the second portion 351b of the end face 351 of the magnetic pole 2035 of the model of the second type. Positions that are on the trailing end side (Z direction) relative to the 0-μm position are expressed in positive values. Positions that are on the leading end side (−Z direction) relative to the 0-μm position are expressed in negative values. The near-field light generating edge 1342e of the front end face 1342 of the plasmon generator 1034 of the model of the first type and the near-field light generating edge 342e of the front end face 342 of the plasmon generator 2034 of the model of the second type are located at a position of −0.12 μm.

It can be seen from FIG. 18 that in the model of the second type, as compared with the model of the first type, the position of the maximum peak of the effective write magnetic field $H_{eff}$ shifts to the leading end side (−Z direction), coming closer to the position of the near-field light generating edge 342e, i.e., the position of −0.12 μm. The effective write magnetic field $H_{eff}$ at the position of −0.12 μm was 4119 Oe in the model of the first type, and 8986 Oe in the model of the second type. Consequently, in the model of the second type, the effective write magnetic field $H_{eff}$ at the position of the near-field light generating edge 342e was approximately twice the effective write magnetic field $H_{eff}$ at the position of the near-field light generating edge 1342e in the model of the first type.

As can be seen from the results of the second simulation, according to the present embodiment, it is possible to put the position of occurrence of the write magnetic field close to the position of occurrence of the near-field light, and consequently, it is possible to increase the write magnetic field at the position of occurrence of the near-field light.

Next, a description will be given of the results of a third simulation that was performed to examine the preferred range of the dimension $D_1$ of the front end face 342 on the virtual straight line L shown in FIG. 2. The third simulation used the model of the second type shown in FIG. 17. $D_{12}$ shown in FIG. 17 corresponds to $D_1$ shown in FIG. 2. In the third simulation, $D_{12}$ was varied within the range from 20 nm to 70 nm.

The conditions of the third simulation other than $D_{12}$ will now be described. For the third simulation, tantalum oxide was selected as the material of the core 32, alumina was selected as the material of the clad layers 31 and 33, and Ag was selected as the material of the plasmon generator 34. The width $W_{WG}$ of the core 32 in the vicinity of the plasmon generator 2034 was set to 0.5 μm. The thickness $T_{WG}$ of the core 32 was set to 0.4 μm (see FIG. 1). The width of the second portion 35B of the magnetic pole 2035 in the medium facing surface 12a was set to 0.24 μm. The length of the plasmon generator 2034 and that of the magnetic pole 2035 in the X direction were both set to 1.5 μm. $D_{22}$ shown in FIG. 17 ($T_{PG}$ shown in FIG. 1) was set to 175 nm. The radius of curvature of the near-field light generating edge 342e was set to 15 nm.

In the third simulation, the laser light to be incident on and propagated through the core 32 was a Gaussian beam polarized in TM mode (where the electric field of the laser light oscillates in the direction perpendicular to the evanescent light generating surface 32c of the core 32) with a wavelength of 823 nm and an incident intensity of 1.0 $V^2/m^2$. Using the three-dimensional finite-difference time-domain method (FDTD method), the peak intensity of the laser light at the end face 32b of the core 32 (hereinafter, referred to as laser light intensity) and the peak intensity of the near-field light at the near-field light generating edge 342e of the front end face 342 of the plasmon generator 2034 (hereinafter, referred to as near-field light intensity) were determined. An intensity ratio was defined and determined as the value of the near-field light intensity divided by the laser light intensity. The material of the core 32, being tantalum oxide, has a refractive index of 2.15 at the wavelength of 823 nm. The material of the clad layers 31 and 33, being alumina, has a refractive index of 1.65 at the wavelength of 823 nm. The rest of the conditions of the third simulation were the same as those of the model of the second type in the second simulation.

Figure 19:
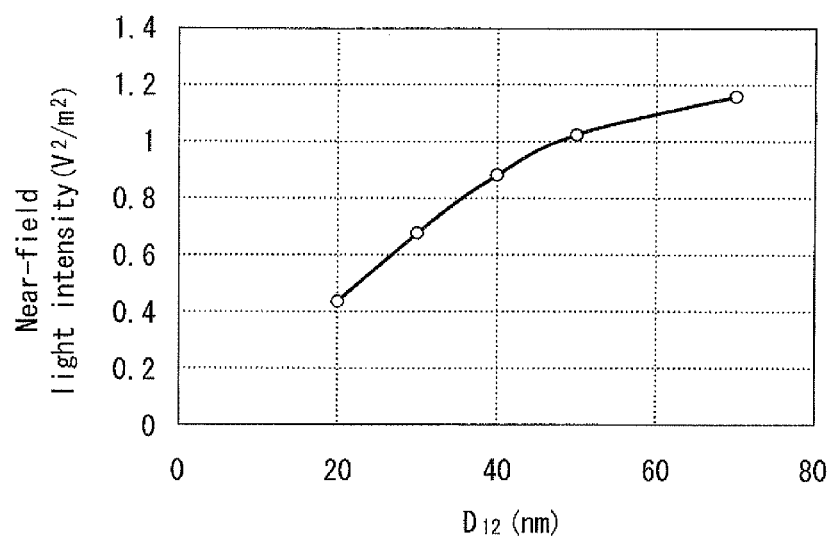
FIG. 19 is a characteristic chart showing the near-field light intensity determined by a third simulation.

FIG. 19 and Table 2 show the results of the third simulation. In FIG. 19, the horizontal axis indicates $D_{12}$, and the vertical axis indicates the near-field light intensity.

TABLE 2

| $D_{12}$ (nm) | Near-field light intensity ($V^2/m^2$) | Laser light intensity ($V^2/m^2$) | Intensity ratio |
| --- | --- | --- | --- |
| 20 | 0.432 | 0.085 | 5.082 |
| 30 | 0.673 | 0.079 | 8.519 |
| 40 | 0.876 | 0.076 | 11.53 |
| 50 | 1.017 | 0.082 | 12.40 |
| 70 | 1.153 | 0.082 | 14.06 |

It can be seen from FIG. 19 and Table 2 that the near-field light intensity and the intensity ratio increase with increasing $D_{12}$. The intensity ratio needs to be 5 or higher in order to form only a desired recording bit on the magnetic recording layer of the magnetic disk 201. It is therefore preferred that $D_{12}$ be 20 nm or greater. Too large $D_{12}$, however, hinders the effect of the embodiment that the position of occurrence of the write magnetic field and the position of occurrence of the near-field light can be located close to each other. It has been experimentally known that $D_{12}$ of 70 nm or less makes it possible to apply a write magnetic field having a desired gradient to the portion of the magnetic recording layer of the magnetic disk 201 that is sufficiently heated by the near-field light. Consequently, it is preferred that $D_{12}$, or $D_1$ shown in FIG. 2, fall within the range of 20 to 70 nm. In such a range, $D_1$ is preferably 30 nm or greater, and yet preferably 40 nm or greater, in order to ensure an intensity ratio of 5 or higher.

Next, a description will be given of the results of a fourth simulation that was performed to examine the preferred range of the dimension $T_{PG}$ shown in FIG. 1. The fourth simulation used the model of the practical example which was used in the first simulation. $T_{PG}$ shown in FIG. 1 was varied to be 170 nm, 200 nm, and 230 nm.

In the fourth simulation, the light density distribution of the near-field light at the surface of a magnetic recording medium located 8 nm away from the medium facing surface 12a was determined by using a three-dimensional finite-difference time-domain method similar to that used in the third simulation. From the light density distribution, the spot diameter of the near-field light (hereinafter, referred to as light spot diameter) and the maximum light density were determined. The light spot diameter was defined as the full width at half maximum in the light density distribution. The rest of the conditions of the fourth simulation were the same as those of the model of the practical example in the first simulation.

Table 3 shows the results of the fourth simulation. It can be seen from Table 3 that $T_{PG}$ of 200 nm or greater can make the maximum light density higher than when $T_{PG}$ is 170 nm, and make both the maximum light density and the light spot diameter constant. It is therefore preferred that $T_{PG}$ be 200 nm or greater. Too large $T_{PG}$, on the other hand, makes the V-shaped groove 331a shown in FIG. 12 too deep, thereby making it difficult to form the groove 331a. In such a point of view, it is preferred that $T_{PG}$ be 400 nm or less. Consequently, it is preferred that $T_{PG}$ fall within the range of 200 to 400 nm.

TABLE 3

| $T_{PG}$ (nm) | Maximum light density ($V^2/m^2$) | Light spot diameter (nm) |
| --- | --- | --- |
| 170 | 0.71 | 54.4 |
| 200 | 0.8 | 57 |
| 230 | 0.8 | 57 |

Second Embodiment

Figure 20:
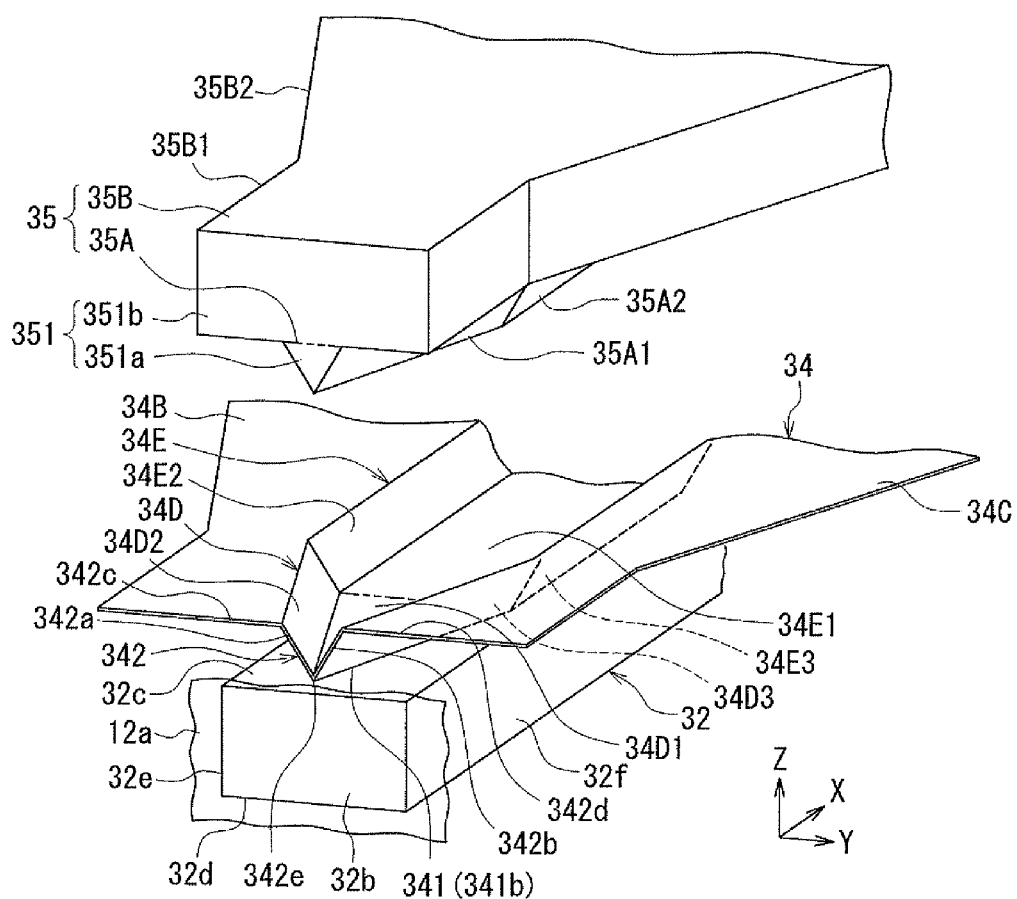
FIG. 20 is a perspective view showing a waveguide's core, a plasmon generator, and a magnetic pole of a thermally-assisted magnetic recording head according to a second embodiment of the invention.
Figure 21:
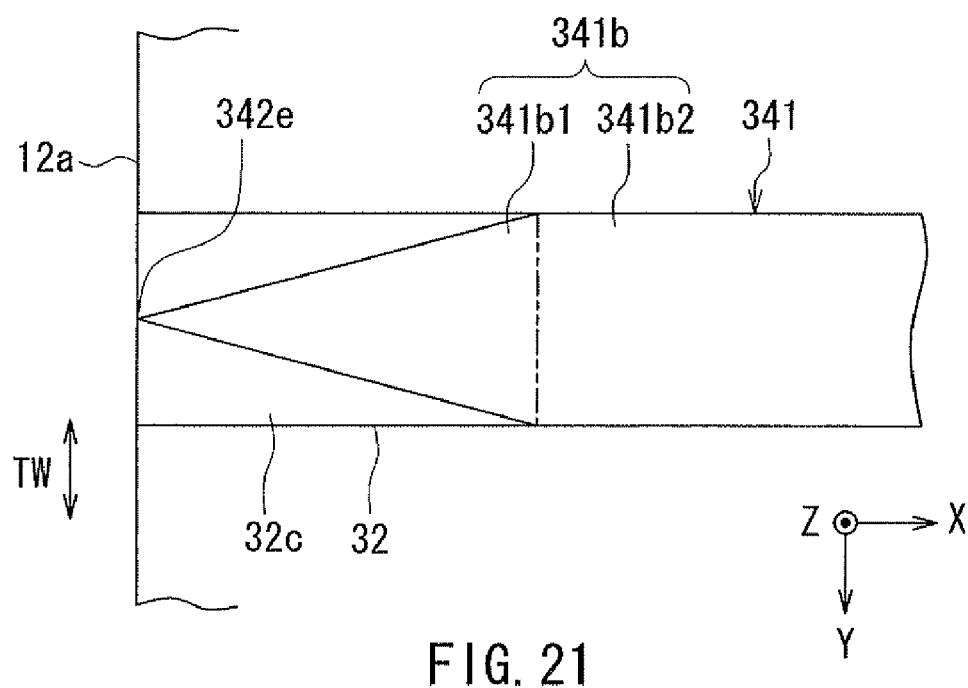
FIG. 21 is a plan view showing a plasmon exciting part of the plasmon generator shown in FIG. 20.

A second embodiment of the invention will now be described with reference to FIG. 20 and FIG. 21. FIG. 20 is a perspective view showing the core of the waveguide, the plasmon generator, and the magnetic pole of the thermally-assisted magnetic recording head according to the present embodiment. FIG. 21 is a plan view showing the plasmon exciting part of the plasmon generator shown in FIG. 20 as viewed from above. The plasmon generator 34 of the present embodiment has a first portion 34D and a second portion 34E, instead of the V-shaped portion 34A of the first embodiment. The first portion 34D has an end face located in the medium facing surface 12a. The second portion 34E is located farther from the medium facing surface 12a than is the first portion 34D, such that the second portion 34E is continuous with the first portion 34D. In FIG. 20, the border between the first portion 34D and the second portion 34E is shown by a chain double-dashed line.

The first portion 34D has a bottom part 34D1 that is shaped like a plate and faces the evanescent light generating surface 32c, and first and second sidewall parts 34D2 and 34D3 that are each shaped like a plate. The sidewall parts 34D2 and 34D3 are located farther from the evanescent light generating surface 32c than is the bottom part 34D1. The bottom part 34D1 connects the first and second sidewall parts 34D2 and 34D3 to each other at their respective edges closer to the evanescent light generating surface 32c.

The bottom part 34D1 has a width that decreases with decreasing distance to the medium facing surface 12a, the width being in the direction parallel to the medium facing surface 12a and the evanescent light generating surface 32c (Y direction). The bottom part 34D1 has an end located in the medium facing surface 12a. At this end of the bottom part 34D1, the bottom part 34D1 has a zero width and the respective bottom ends of the first and second sidewall parts 34D2 and 34D3 are in contact with each other.

The distance between the first and second sidewall parts 34D2 and 34D3 in the direction parallel to the medium facing surface 12a and the evanescent light generating surface 32c (Y direction) increases with increasing distance from the evanescent light generating surface 32c, and decreases with decreasing distance to the medium facing surface 12a.

The second portion 34E has a bottom part 34E1 that is continuous with the bottom part 34D1 of the first portion 34D, a first sidewall part 34E2 that is continuous with the first sidewall part 34D2 of the first portion 34D, and a second sidewall part 34E3 that is continuous with the second sidewall part 34D3 of the first portion 34D. The bottom part 34E1 has a constant width in the direction parallel to the medium facing surface 12a and the evanescent light generating surface 32c (Y direction) regardless of the distance from the medium facing surface 12a.

The distance between the first and second sidewall parts 34E2 and 34E3 in the direction parallel to the medium facing surface 12a and the evanescent light generating surface 32c (Y direction) increases with increasing distance from the evanescent light generating surface 32c, but does not change according to the distance from the medium facing surface 12a.

As shown in FIG. 20, the first portion 34D and the second portion 34E of the plasmon generator 34 form inside a space for accommodating a part of the magnetic pole 35.

In the present embodiment, the extended portions 34B and 34C spread out from the top ends of the first portion 34D and the second portion 34E in the direction parallel to the medium facing surface 12a and the evanescent light generating surface 32c (Y direction). As viewed from above, the outer edges of the extended portions 34B and 34C lie outside the outer edges of the magnetic pole 35. In the present embodiment, the second portion 35B of the magnetic pole 35 is in contact with the extended portions 34B and 34C.

The plasmon exciting part 341 of the present embodiment includes a flat surface part 341b instead of the propagative edge 341a of the first embodiment. The flat surface part 341b includes a width changing portion 341b1 and a constant width portion 341b2. The width changing portion 341b1 is formed by a surface of the bottom part 34D1 of the first portion 34D that is closer to the evanescent light generating surface 32c. The constant width portion 341b2 is formed by a surface of the bottom part 34E1 of the second portion 34E that is closer to the evanescent light generating surface 32c. In FIG. 21, the border between the width changing portion 341b1 and the constant width portion 341b2 is shown by a chain double-dashed line.

The width changing portion 341b1 has a width that decreases with decreasing distance to the medium facing surface 12a, the width being in the direction parallel to the medium facing surface 12a and the evanescent light generating surface 32c (Y direction). The width changing portion 341b1 has a front end part that is located in the medium facing surface 12a, and two sides that are opposite in the direction of the width (Y direction). The two sides of the width changing portion 341b1 form the same angle with respect to the direction perpendicular to the medium facing surface 12a (X direction). The angle falls within the range of 3 to 50 degrees, and preferably within the range of 10 to 25 degrees.

The constant width portion 341b2 is located farther from the medium facing surface 12a than is the width changing portion 341b1, such that the constant width portion 341b2 is continuous with the width changing portion 341b1. The constant width portion 341b2 has a constant width in the direction parallel to the medium facing surface 12a and the evanescent light generating surface 32c (Y direction) regardless of the distance from the medium facing surface 12a.

In the present embodiment, the first portion 342a and the second portion 342b of the front end face 342 lie at respective ends of the first and second sidewall parts 34D1 and 34D2 of the first portion 34D, and are connected to each other into a V-shape.

In the present embodiment, the first portion 35A of the magnetic pole 35 is accommodated in the space formed by the first portion 34D and the second portion 34E of the plasmon generator 34. The first portion 35A includes a front part 35A1 and a rear part 35A2. The front part 35A1 is accommodated in the space formed by the first portion 34D (the bottom part 34D1, the first sidewall part 34D2, and the second sidewall part 34D3) of the plasmon generator 34. The rear part 35A2 is accommodated in the space formed by the second portion 34E (the bottom part 34E1, the first sidewall part 34E2, and the second sidewall part 34E3) of the plasmon generator 34.

The front part 35A1 is interposed between the first and second sidewall parts 34D2 and 34D3 of the first portion 34D of the plasmon generator 34, and is contact with the bottom part 34D1, the first sidewall part 34D2, and the second sidewall part 34D3. The width of the front part 35A1 in the direction parallel to the medium facing surface 12a and the evanescent light generating surface 32c (Y direction) increases with increasing distance from the evanescent light generating surface 32c, and decreases with decreasing distance to the medium facing surface 12a.

The front part 35A1 has an end face located in the medium facing surface 12a. The first portion 351a of the end face 351 of the magnetic pole 35 located in the medium facing surface 12a is formed by the end face of the front part 35A1.

The rear part 35A2 is interposed between the first and second sidewall parts 34E2 and 34E3 of the second portion 34E of the plasmon generator 34, and is contact with the bottom part 34E1, the first sidewall part 34E2, and the second sidewall part 34E3. The width of the rear part 35A2 in the direction parallel to the medium facing surface 12a and the evanescent light generating surface 32c (Y direction) increases with increasing distance from the evanescent light generating surface 32c, but does not change according to the distance from the medium facing surface 12a.

The plasmon generator 34 need not necessarily have the second portion 34E. If the plasmon generator 34 does not have the second portion 34E, the first portion 35A of the magnetic pole 35 does not have the rear part 35A2.

The effects of the thermally-assisted magnetic recording head according to the present embodiment will now be described. In the present embodiment, as in the first embodiment, the plasmon generator 34 has the extended portions 34B and 34C. This promotes the heat dissipation from the plasmon generator 34, and thereby makes it possible to suppress a rise in temperature of the plasmon generator 34. In the present embodiment, the second portion 35B of the magnetic pole 35 is in contact with the extended portions 34B and 34C of the plasmon generator 34. As in the first embodiment, the heat generated in the plasmon generator 34 can thus be effectively dissipated through the magnetic pole 35, the coupling layer 36, and the top yoke layer 43. In the present embodiment, as viewed from above, the outer edges of the extended portions 34B and 34C lie outside the outer edges of the magnetic pole 35. This makes it possible, as in the first embodiment, to make the extended portions 34B and 34C large without being restricted by the width of the magnetic pole 35, so that it is possible to promote the heat dissipation from the plasmon generator 34.

In the present embodiment, the plasmon exciting part 341 of the plasmon generator 34 includes the flat surface part 341b. The flat surface part 341b includes the width changing portion 341b1. The width of the width changing portion 341b1 in the direction parallel to the medium facing surface 12a and the evanescent light generating surface 32c (Y direction) decreases with decreasing distance to the medium facing surface 12a. The surface plasmons excited on the flat surface part 341*b* are gradually transformed into edge plasmons, which are surface plasmons to propagate along the two sides of the width changing portion 341*b*1 that are opposite in the direction of the width (Y direction), while propagating over the width changing portion 341*b*1. The surface plasmons (including edge plasmons) propagating over the width changing portion 341*b*1 reach the near-field light generating edge 342*e*.

In the width changing portion 341*b*1, the propagating plasmons increase in electric field intensity. This is presumably based on the following first and second principles. Initially, a description will be given of the first principle. The wave number of the surface plasmons propagating over the width changing portion 341*b*1 increases as the width of the width changing portion 341*b*1 decreases. As the wave number of the surface plasmons increases, the speed of travel of the surface plasmons decreases. This consequently increases the energy density of the surface plasmons and enhances the electric field intensity of the surface plasmons.

Next, a description will be given of the second principle. When the surface plasmons propagate over the width changing portion 341*b*1, some of the surface plasmons impinge on the two sides of the width changing portion 341*b*1 that are opposite in the direction of the width (Y direction) to scatter, thereby generating a plurality of plasmons with different wave numbers. Some of the plurality of plasmons thus generated are transformed into edge plasmons having a wave number higher than that of the surface plasmons propagating over a flat surface. In this way, the surface plasmons are gradually transformed into the edge plasmons to propagate along the two sides, whereby the edge plasmons gradually increase in electric field intensity. As compared with the surface plasmons propagating over a flat surface, the edge plasmons are higher in wave number and lower in speed of travel. Consequently, the transformation of the surface plasmons into the edge plasmons increases the energy density of the plasmons. In the width changing portion 341*b*1, the foregoing transformation of the surface plasmons into the edge plasmons is accompanied by the generation of new surface plasmons based on the evanescent light occurring from the evanescent light generating surface 32*c*. The new surface plasmons are also transformed into edge plasmons. As a result, the edge plasmons increase in electric field intensity. In this way, it is possible to obtain edge plasmons that are higher in electric field intensity than the surface plasmons originally generated.

In the width changing portion 341*b*1, the surface plasmons propagating over the flat surface and the edge plasmons having a wave number higher than that of the surface plasmons coexist. It can be considered that both the surface plasmons and the edge plasmons increase in electric field intensity in the width changing portion 341*b*1 based on the first and second principles described above. In the width changing portion 341*b*1, the electric field intensity of the plasmons can thus be enhanced as compared with a case where either one of the first principle and the second principle is in operation.

In the present embodiment, the flat surface part 341*b* of the plasmon exciting part 341 of the plasmon generator 34 further includes the constant width portion 341*b*2. Suppose that the flat surface part 341*b* does not include the constant width portion 341*b*2, and the width changing portion 341*b*1 extends up to the end of the flat surface part 341*b* opposite from the medium facing surface 12*a*. In such a case, the maximum width of the flat surface part 341*b* is greater as compared with the case where the flat surface part 341*b* includes the constant width portion 341*b*2. Then, the width $W_{WG}$ of the core 32 in the vicinity of the plasmon generator 34 needs to be increased to the maximum width of the flat surface part 341*b*. Consequently, at least a part of the core 32 in the vicinity of the plasmon generator 34 is likely to enter a multi mode that is capable of propagating a plurality of modes (propagation modes) of light. In this case, the mode that contributes to the excitation of surface plasmons on the flat surface part 341*b* weakens to decrease the use efficiency of the light that is propagated through the core 32. In contrast, according to the present embodiment, the flat surface part 341*b* includes the constant width portion 341*b*2, and it is therefore possible to make the width $W_{WG}$ of the core 32 in the vicinity of the plasmon generator 34 smaller than that in the case where the flat surface part 341*b* does not include the constant width portion 341*b*2. According to the present embodiment, it is therefore possible to bring at least a part of the core 32 in the vicinity of the plasmon generator 34 into a single mode that is capable of propagating only a single mode of light. Consequently, it is possible to improve the use efficiency of the laser light that is propagated through the core 32.

Moreover, in the present embodiment, the first portion 34D of the plasmon generator 34 has the bottom part 34D1 and the first and second sidewall parts 34D2 and 34D3. The width of the bottom part 34D1 in the direction parallel to the medium facing surface 12*a* and the evanescent light generating surface 32*c* (Y direction) decreases with decreasing distance to the medium facing surface 12*a*. The distance between the first and second sidewall parts 34D2 and 34D3 in the direction parallel to the medium facing surface 12*a* and the evanescent light generating surface 32*c* (Y direction) increases with increasing distance from the evanescent light generating surface 32*c*, and decreases with decreasing distance to the medium facing surface 12*a*. The magnetic pole 35 includes the front part 35A1 that is interposed between the first and second sidewall parts 34D2 and 34D3 and in contact with the bottom part 34D1, the first sidewall part 34D2 and the second sidewall part 34D3. The width of the front part 35A1 in the direction parallel to the medium facing surface 12*a* and the evanescent light generating surface 32*c* (Y direction) decreases with decreasing distance to the medium facing surface 12*a*. Consequently, according to the present embodiment, magnetic fluxes passing through the magnetic pole 35 can be concentrated as they approach the medium facing surface 12*a*. This makes it possible to produce a high write magnetic field from the first portion 351*a* of the end face 351.

The present embodiment may be modified so that the plasmon generator of the invention is configured as in the following modification example. In the configuration of the modification example, the V-shaped portion 34A of the first embodiment is provided between the medium facing surface 12*a* and the first portion 34D. In such a case, the plasmon exciting part 341 includes the propagative edge 341*a* and the flat surface part 3431*b*. As described previously, the medium facing surface 12*a* is formed by polishing a surface that is formed by cutting the substructure. In such a case, the position of the medium facing surface 12*a* may slightly vary. Suppose that the plasmon generator 34 is designed not to have the V-shaped portion 34A or the propagative edge 341*a* so that the ends of the first portion 34D and the width changing portion 341*b*1 are located in the medium facing surface 12*a*. If so, variations in the position of the medium facing surface 12*a* change the shape of the front end face 342 of the plasmon generator 34, or the shape of the near-field light generating edge 342*e* in particular. As a result, the near-field light occurring from the plasmon generator 34 can vary in characteristic. In contrast, according to the modification example described above, the plasmon generator 34 has the V-shaped portion 34A and the propagative edge 341*a*. This makes it possible that, even if the position of the medium facing surface 12a somewhat varies, the front end face 342 of the plasmon generator 34 remains unchanged in shape. According to the foregoing modification example, it is therefore possible to prevent the characteristics of the near-field light generated by the plasmon generator 34 from being changed due to variations in the position of the medium facing surface 12a.

Moreover, in the foregoing modification example, the first portion 35A of the magnetic pole 35 has a triangular-prism-shaped portion that is accommodated in the V-shaped portion 34A. The width of the triangular-prism-shaped portion in the direction parallel to the medium facing surface 12a and the evanescent light generating surface 32c (Y direction) does not change according to the distance from the medium facing surface 12a. According to the foregoing modification example, it is therefore possible to keep the shape of the first portion 351a of the end face 351 constant even if the position of the medium facing surface 12a somewhat varies. Consequently, according to the modification example, it is possible to suppress a change in the write characteristics due to variations in the position of the medium facing surface 12a.

The remainder of configuration, function and effects of the present embodiment are similar to those of the first embodiment.

Third Embodiment

Figure 22:
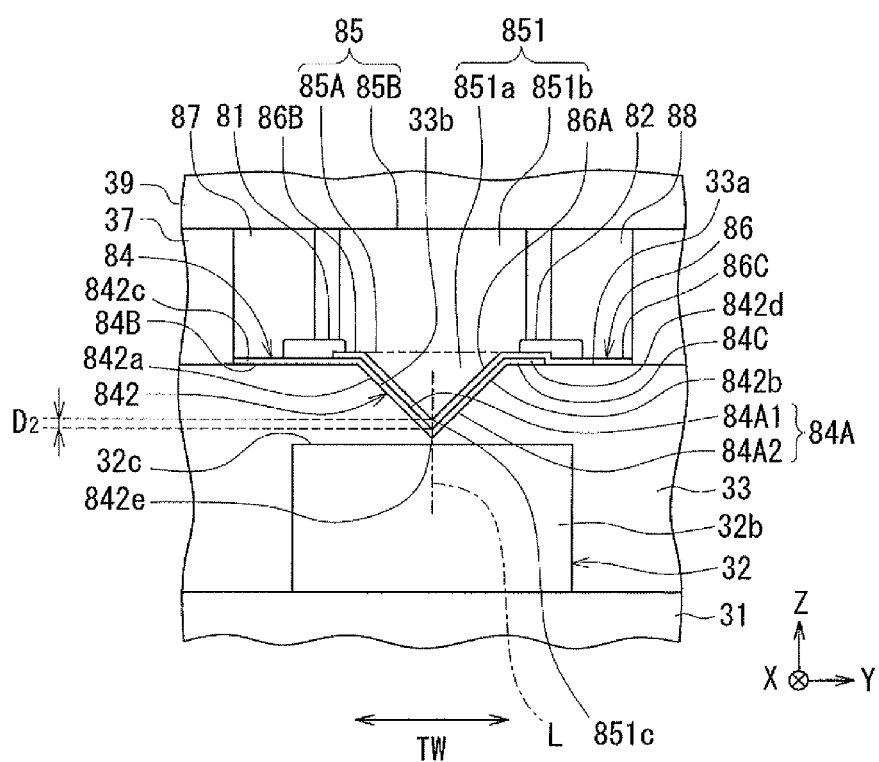
FIG. 22 is a front view showing a part of the medium facing surface of a head unit of a thermally-assisted magnetic recording head according to a third embodiment of the invention.
Figure 23:
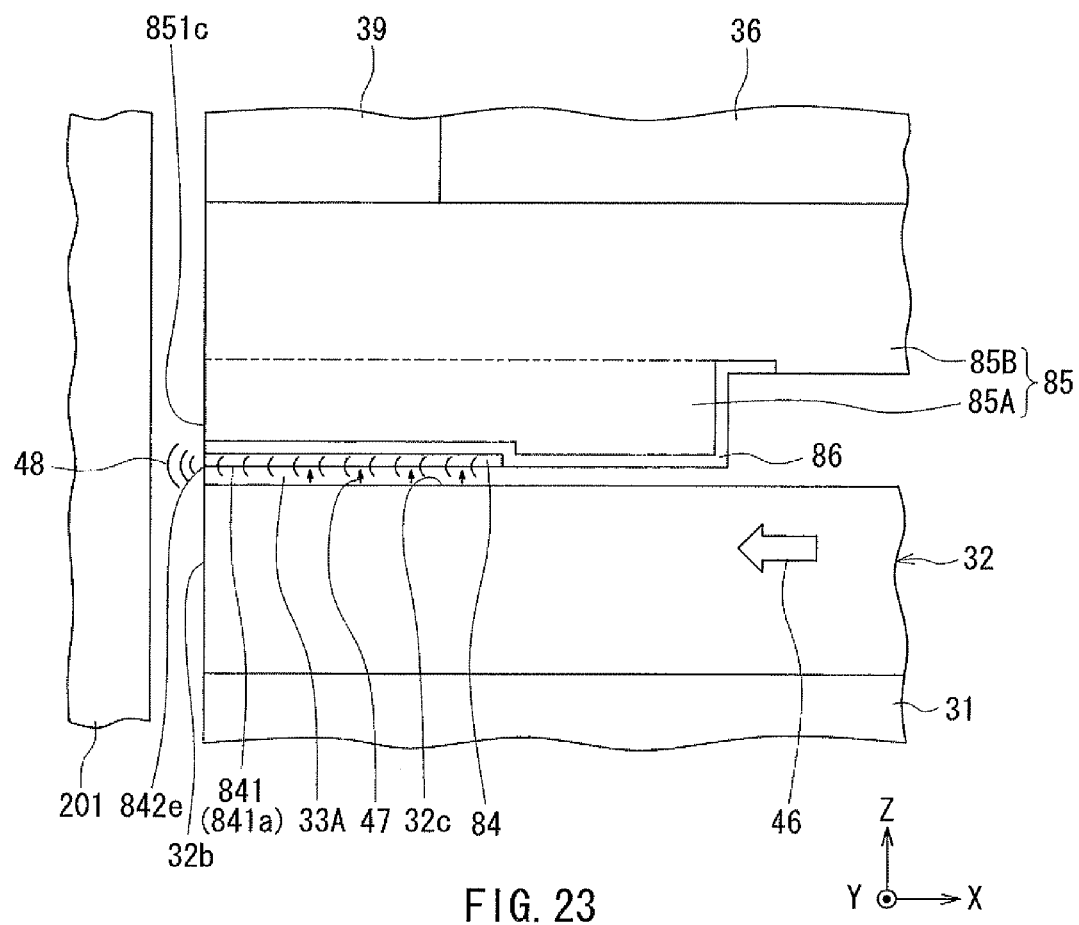
FIG. 23 is a cross-sectional view showing a waveguide's core, a plasmon generator, and a magnetic pole of the thermally-assisted magnetic recording head according to the third embodiment of the invention.

A third embodiment of the invention will now be described with reference to FIG. 22 and FIG. 23. FIG. 22 is a front view showing a part of the medium facing surface of the head unit of the thermally-assisted magnetic recording head according to the present embodiment. FIG. 23 is a cross-sectional view showing the core of the waveguide, the plasmon generator, and the magnetic pole of the thermally-assisted magnetic recording head according to the present embodiment. The thermally-assisted magnetic recording head according to the present embodiment has a plasmon generator 84 and a magnetic pole 85, instead of the plasmon generator 34 and the magnetic pole 35 of the first embodiment. The plasmon generator 84 is made of the same material as that of the plasmon generator 34 of the first embodiment. The magnetic pole 85 is made of the same material as that of the magnetic pole 35 of the first embodiment.

The plasmon generator 84 has an outer surface that includes a plasmon exciting part 841 and a front end face 842. The plasmon exciting part 841 faces the evanescent light generating surface 32c of the core 32 with a predetermined distance therebetween. The front end face 842 is located in the medium facing surface 12a. The plasmon generator 84 further has a V-shaped portion 84A that has an end face located in the medium facing surface 12a. The V-shaped portion 84A has a first sidewall part 84A1 and a second sidewall part 84A2 that are each connected to the plasmon exciting part 841, and that increase in distance from each other with increasing distance from the plasmon exciting part 841. The shapes and locations of the first and second sidewall parts 84A1 and 84A2 are the same as those of the first and second sidewall parts 34A1 and 34A2 of the first embodiment.

The plasmon generator 84 further has an extended portion 84B and an extended portion 84C. The extended portion 84B is connected to an edge of the first sidewall part 84A1 opposite from the plasmon exciting part 841. The extended portion 84C is connected to an edge of the second sidewall part 84A2 opposite from the plasmon exciting part 841. From the edge of the first sidewall part 84A1 opposite from the plasmon exciting part 841, the extended portion 84B extends parallel to the evanescent light generating surface 32c and away from both the first and second sidewall parts 84A1 and 84A2. From the edge of the second sidewall part 84A2 opposite from the plasmon exciting part 841, the extended portion 84C extends parallel to the evanescent light generating surface 32c and away from both the first and second sidewall parts 84A1 and 84A2. Each of the extended portions 84B and 84C has a constant width in the direction parallel to the medium facing surface 12a and the evanescent light generating surface 32c (Y direction) regardless of the distance from the medium facing surface 12a. In the example shown in FIG. 22, the width of the extended portion 84B is greater than that of the extended portion 84C. Note that the plasmon generator 84 need not necessarily have the extended portion 84C.

The plasmon exciting part 841 includes a propagative edge 841a that lies at an end of the connected first and second sidewall parts 84A1 and 84A2 closer to the evanescent light generating surface 32c. The shape and location of the propagative edge 841a are the same as those of the propagative edge 341a of the first embodiment.

The front end face 842 has a first portion 842a and a second portion 842b that lie at respective ends of the first and second sidewall parts 84A1 and 84A2 and are connected to each other into a V-shape, a third portion 842c that lies at an end of the extended portion 84B, a fourth portion 842d that lies at an end of the extended portion 84C, and a near-field light generating edge 842e that lies at an end of the plasmon exciting part 841 (propagative edge 841a). The shape and location of the near-field light generating edge 842e are the same as those of the near-field light generating edge 342e of the first embodiment.

The thermally-assisted magnetic recording head further includes a conductor 86 made of a conductive material. The conductor 86 has a Seebeck coefficient different from that of the plasmon generator 84, and is in contact with the plasmon generator 84. As shown in FIG. 22, the conductor 86 makes contact with the plasmon generator 84 at least on a virtual straight line L, the virtual straight line L passing through the near-field light generating edge 842e and extending in the direction perpendicular to the evanescent light generating surface 32c. In the present embodiment, in particular, the conductor 86 is disposed on the V-shaped portion 84A and the extended portions 84B and 84C of the plasmon generator 84 and makes contact with such portions.

As will be detailed later, in the present embodiment, heat absorption by the Peltier effect occurs in a contact area between the plasmon generator 84 and the conductor 86 when a current is made to flow from one of the plasmon generator 84 and the conductor 86, the one being lower in Seebeck coefficient, to the other which is higher in Seebeck coefficient, through the contact area. To increase the amount of heat absorption by the Peltier effect, it is preferred that the difference between the Seebeck coefficient of the plasmon generator 84 and that of the conductor 86 be as great as possible. The Seebeck coefficient of the plasmon generator 84 and that of the conductor 86 may have opposite signs.

For example, the plasmon generator 84 may be made of Au, and the conductive material used to form the conductor 86 may contain at least one of Co, Ni, and a CuNi alloy. As described in a literature "Japanese Journal of Applied Physics, Vol. 44, No. 1, 2005, pp. L12-14," Au has a Seebeck coefficient of 1.9 µV/K at 300 K, and Co has a Seebeck coefficient of −30.8 µV/K at 300 K. The plasmon generator 84 made of Au thus has a Seebeck coefficient of 1.9 µV/K at 300 K. If the conductor 86 is made of Co, the conductor 86 has a Seebeck coefficient of −30.8 µV/K at 300K. The foregoing literature describes that cooling by the Peltier effect occurs at the Au—Co interface. Consequently, if the plasmon generator 84 is made of Au, Co is an appropriate conductive material for forming the conductor 86. Like Co, each of Ni and a CuNi alloy has a negative Seebeck coefficient of a high absolute value. If the plasmon generator 84 is made of Au, then Ni and a CuNi alloy are also appropriate as the conductive material for forming the conductor 86, aside from Co. When the plasmon generator 84 is made of Au, the conductive material used to form the conductor 86 may be an alloy that contains at least one of Co, Ni, and a CuNi alloy, and that is lower in Seebeck coefficient than Au.

Now, the dimension of the conductor 86 on the virtual straight line L shown in FIG. 22 will be represented by the symbol Dz. Too small $D_2$ makes the resistance of the conductor 86 too high. Too large $D_2$ hinders the effect of the embodiment that the position of occurrence of the write magnetic field and the position of occurrence of the near-field light can be located close to each other. In such a point of view, it is preferred that $D_2$ fall within the range of 20 to 50 nm.

In the example shown in FIG. 22, the conductor 86 is greater than the V-shaped portion 84A of the plasmon generator 84 in dimension in the track width direction TW (Y direction) at the medium facing surface 12a. The dimension of the conductor 86 in the track width direction TW is 0.6 μm, for example. In the example shown in FIG. 23, the conductor 86 is greater than the plasmon generator 84 in length in the X direction. The length of the conductor 86 in the X direction is 1.2 μm, for example.

As shown in FIG. 22, the conductor 86 includes a V-shaped portion 86A that has an end face located in the medium facing surface 12a. The V-shaped portion 86A is arranged along the inner surfaces of the V-shaped portion 84A of the plasmon generator 84 and extends in the direction perpendicular to the medium facing surface 12a (X direction). The V-shaped portion 86A is V-shaped in cross section parallel to the medium facing surface 12a.

The conductor 86 further includes extended portions 86B and 86C that spread out from the top ends of the V-shaped portion 86A of the conductor 86 in the direction parallel to the medium facing surface 12a and the evanescent light generating surface 32c (Y direction). The extended portion 86B is arranged along the top surface of the extended portion 84B of the plasmon generator 84. The extended portion 86C is arranged along the top surface of the extended portion 84C of the plasmon generator 84 and the top surface 33a of the clad layer 33. Each of the extended portions 86B and 86C has a constant width in the direction parallel to the medium facing surface 12a and the evanescent light generating surface 32c (Y direction) regardless of the distance from the medium facing surface 12a. In the example shown in FIG. 22, the width of the extended portion 86B is smaller than that of the extended portion 84B of the plasmon generator 84. The width of the extended portion 86C is greater than that of the extended portion 86B and greater than that of the extended portion 84C of the plasmon generator 84. Note that the conductor 86 need not necessarily have the extended portion 86B.

The magnetic pole 85 is disposed on the conductor 86 so that at least a part of the conductor 86, that is, the V-shaped portion 86A, is interposed between the plasmon generator 84 and the magnetic pole 85. The magnetic pole 85 has a first portion 85A and a second portion 85B. The second portion 85B is located farther from the evanescent light generating surface 32c of the core 32 than is the first portion 85A. In FIG. 22 and FIG. 23, the border between the first portion 85A and the second portion 85B is shown by a chain double-dashed line. The first portion 85A has a triangular-prism-shaped part in the vicinity of the medium facing surface 12a. The triangular-prism-shaped part of the first portion 85A is interposed between the first and second sidewall parts 84A1 and 84A2 of the plasmon generator 84. The V-shaped portion 86A of the conductor 86 is interposed between the triangular-prism-shaped part of the first portion 85A and the first and second sidewall parts 84A1 and 84A2.

As shown in FIG. 22, the magnetic pole 85 has an end face 851 located in the medium facing surface 12a. The end face 851 includes a first portion 851a and a second portion 851b. The first portion 851a is the end face of the first portion 85A. The second portion 851b is the end face of the second portion 85B. The first portion 851a has a triangular shape and is interposed between the first and second portions 842a and 842b of the front end face 842 of the plasmon generator 84. The end face of the V-shaped portion 86A of the conductor 86 is interposed between the first portion 851a and the first and second portions 842a and 842b of the front end face 842. The end face 851a has a tip 851c located at its bottom end.

The thermally-assisted magnetic recording head further includes a first electrode 87 that is electrically connected to the extended portion 84B of the plasmon generator 84, and a second electrode 88 that is electrically connected to the extended portion 86C of the conductor 86. The first and second electrodes 87 and 88 are located on opposite sides of the magnetic pole 85 in the track width direction TW, each at a distance from the magnetic pole 85. Not-shown leads are connected to the first and second electrodes 87 and 88, respectively. The first and second electrodes 87 and 88 are made of a conductive material. The first and second electrodes 87 and 88 may be made of the same material (magnetic metal material) as that of the magnetic pole 85.

The thermally-assisted magnetic recording head further includes insulating films 81 and 82. The insulating films 81 and 82 cover the respective portions of the plasmon generator 84 and the conductor 86 that are interposed between the magnetic pole 85 and the first and second electrodes 87 and 88. The insulating films 81 and 82 extend in the direction perpendicular to the medium facing surface 12a (X direction). The insulating films 81 and 82 each have a thickness (dimension in the Z direction) of 50 nm, for example. The insulating films 81 and 82 are each made of an insulating material such as alumina.

Reference is now made to FIG. 24A to FIG. 26A, FIG. 24B to FIG. 26B, and FIG. 27 to FIG. 29 to describe an example of the method of forming the plasmon generator 84, the magnetic pole 85 and the conductor 86. FIG. 24A to FIG. 26A are plan views each showing a part of a stack of layers fabricated in the process of forming the plasmon generator 84, the magnetic pole 85 and the conductor 86. FIG. 24B to FIG. 26B, and FIG. 27 to FIG. 29 are cross-sectional views each showing a part of the stack of layers fabricated in the process of forming the plasmon generator 84, the magnetic pole 85 and the conductor 86. In FIG. 24A to FIG. 26A, the symbol ABS indicates the position where the medium facing surface 12a is to be formed. FIG. 24B to FIG. 26B, and FIG. 27 to FIG. 29 each show a cross section in the position ABS.

The method of forming the plasmon generator 84, the magnetic pole 85 and the conductor 86 is the same as in the first embodiment up to the step of forming the clad layer 33 as shown in FIG. 13.

Figure 24A:
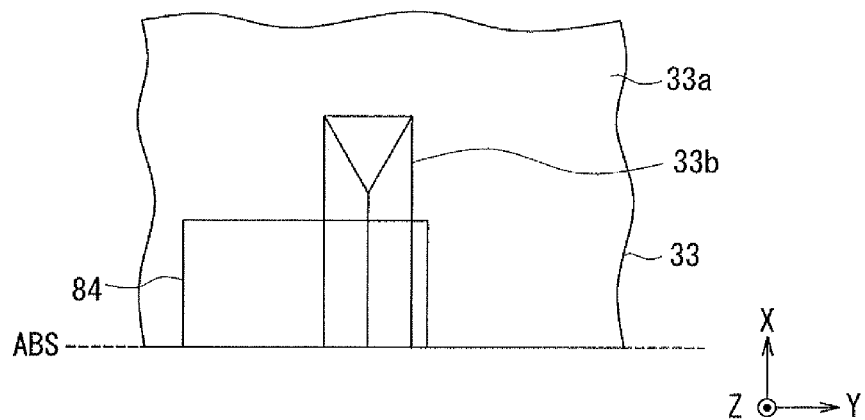
FIG. 24A and FIG. 24B are explanatory diagrams showing a step of a method of forming the plasmon generator, the magnetic pole, and the conductor of the third embodiment of the invention.
Figure 24B:
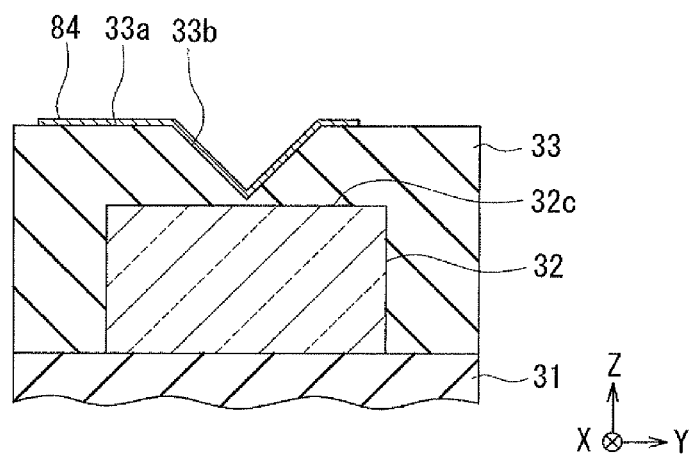

FIG. 24A and FIG. 24B show the next step. In this step, a metal film that is to become the plasmon generator 84 later is initially formed by, for example, sputtering, so as to cover the entire top surface of the stack shown in FIG. 13. Next, the metal film is patterned by etching a part of the metal film by ion milling, for example. As a result, the remaining metal film becomes the plasmon generator 84.

Figure 25A:
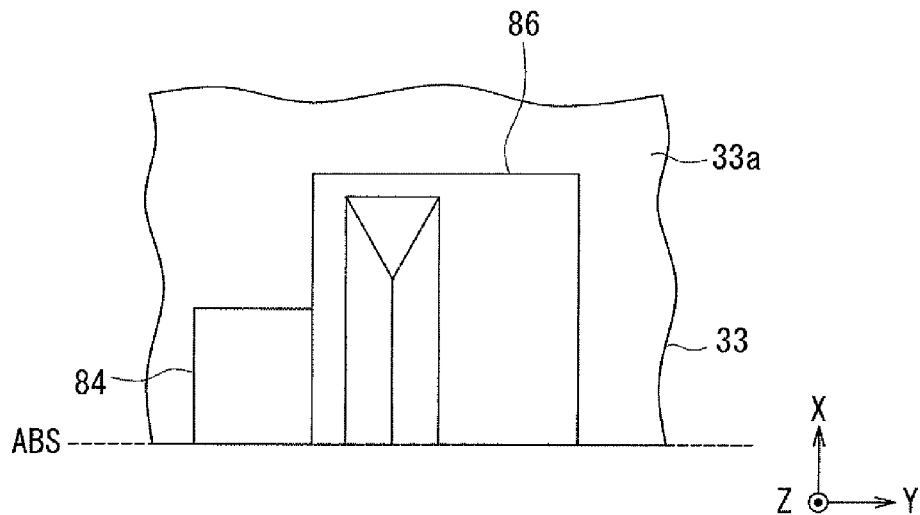
FIG. 25A and FIG. 25B are explanatory diagrams showing a step that follows the step shown in FIG. 24A and FIG. 24B.
Figure 25B:
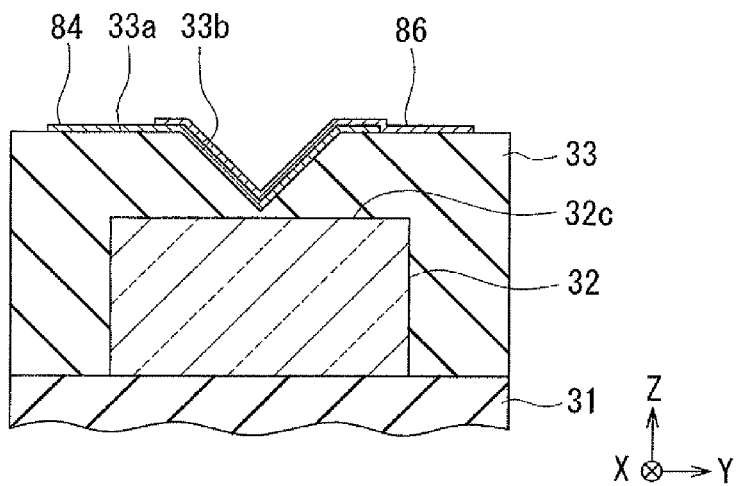

FIG. 25A and FIG. 25B show the next step. In this step, the conductor 86 is formed by lift-off, for example. Where the conductor 86 is formed by lift-off, a mask having an opening that has a shape corresponding to the planar shape of the conductor 86 to be formed later is initially formed. The mask can be formed by patterning a photoresist layer by photolithography, for example. With the mask left intact, a metal film to become the conductor 86 later is then formed by, for example, sputtering, so as to cover the entire top surface of the stack shown in FIG. 24A and FIG. 24B. Next, the mask is lifted off. The remaining metal film thereby becomes the conductor 86.

Figure 26A:
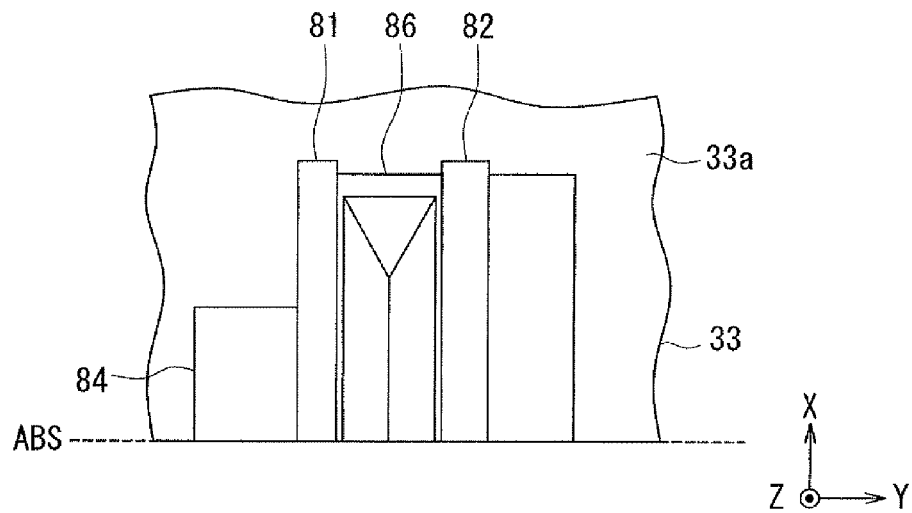
FIG. 26A and FIG. 26B are explanatory diagrams showing a step that follows the step shown in FIG. 25A and FIG. 25B.
Figure 26B:
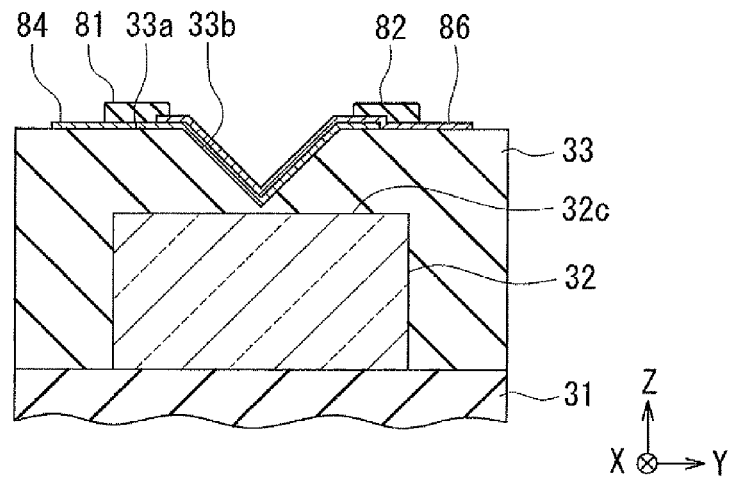

FIG. 26A and FIG. 26B show the next step. In this step, the insulating films 81 and 82 are selectively formed on the plasmon generator 84 and the conductor 86.

Figure 27:
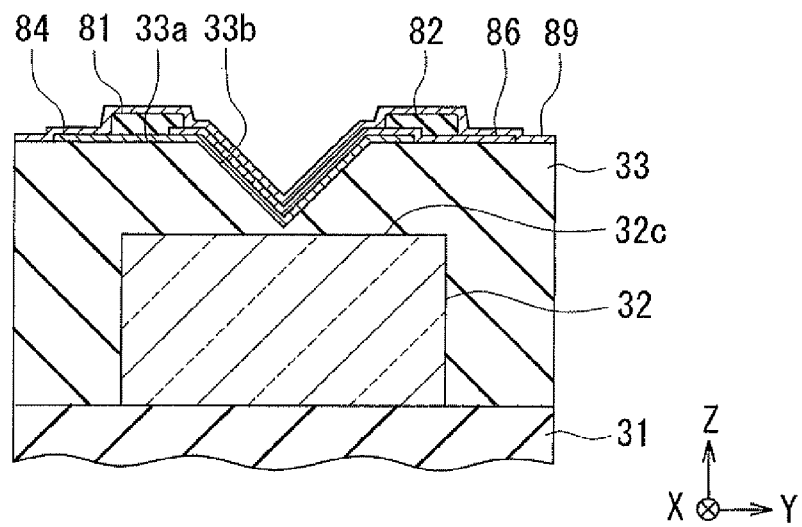
FIG. 27 is a cross-sectional view showing a step that follows the step shown in FIG. 26A and FIG. 26B.

FIG. 27 shows the next step. In this step, an electrode film 89 is formed by, for example, sputtering, so as to cover the entire top surface of the stack shown in FIG. 26A and FIG. 26B. The material of the electrode film 89 is FeCo, for example.

Figure 28:
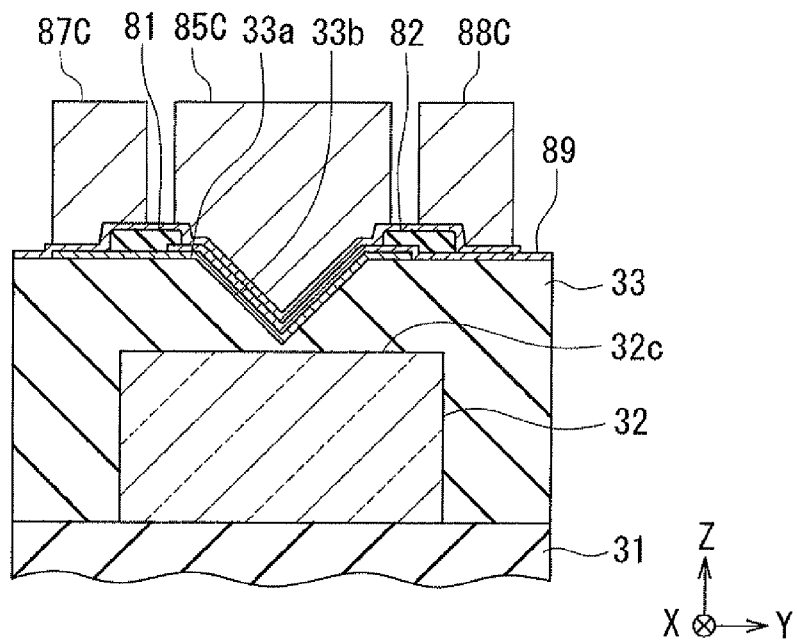
FIG. 28 is a cross-sectional view showing a step that follows the step shown in FIG. 27.

FIG. 28 shows the next step. In this step, plating films 85C, 87C, and 88C are formed by, for example, frame plating, using the electrode film 89 as the electrode. The plating film 85C has a shape corresponding to the planar shape of the second portion 85B of the magnetic pole 85. The plating film 87C has a shape corresponding to the planar shape of the first electrode 87. The plating film 88C has a shape corresponding to the planar shape of the second electrode 88. The plating film 85C is formed also on a part of the electrode film 89 located on the insulating film 81 and on a part of the electrode film 89 located on the insulating film 82. The plating film 87C is formed also on a part of the electrode film 89 located on the insulating film 81. The plating film 88C is formed also on a part of the electrode film 89 located on the insulating film 82.

Figure 29:
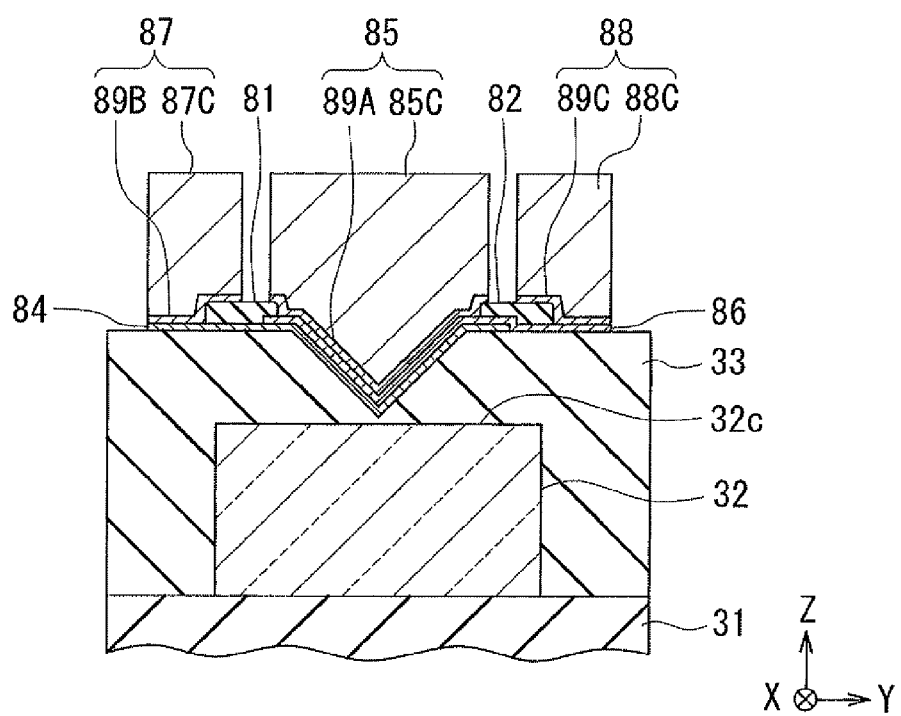
FIG. 29 is a cross-sectional view showing a step that follows the step shown in FIG. 28.

FIG. 29 shows the next step. In this step, the electrode film 89 is etched by, for example, ion milling, using the plating films 85C, 87C and 88C as the etching mask, until the top surface 33a of the clad layer 33 and the top surfaces of the insulating films 81 and 82 are exposed. As a result, the plating film 85C and a first portion 89A of the electrode film 89 that remains below the plating film 85C form the magnetic pole 85. The plating film 87C and a second portion 89B of the electrode film 89 that remains below the plating film 87C form the first electrode 87. The plating film 88C and a third portion 89C of the electrode film 89 that remains below the plating film 88C form the second electrode 88. The insulating films 81 and 82 prevent the portions of the plasmon generator 84 and the conductor 86 interposed between the magnetic pole 85 and the first and second electrodes 87 and 88 from being etched during the etching of the electrode film 89.

The magnetic pole 85, the first electrode 87 and the second electrode 88 are formed simultaneously in the steps shown in FIG. 27 to FIG. 29. However, the formation of the magnetic pole 85 and the formation of the first and second electrodes 87 and 88 need not necessarily be simultaneous.

The operation and effects of the thermally-assisted magnetic recording head according to the present embodiment will now be described. The thermally-assisted magnetic recording head according to the present embodiment includes the conductor 86 made of a conductive material, the conductor 86 having a Seebeck coefficient different from that of the plasmon generator 84 and being in contact with the plasmon generator 84. In the present embodiment, heat absorption by the Peltier effect occurs in the contact area between the plasmon generator 84 and the conductor 86 when a current is made to flow from one of the plasmon generator 84 and the conductor 86, the one being lower in Seebeck coefficient, to the other which is higher in Seebeck coefficient, through the contact area. A voltage for generating the current that causes the heat absorption by the Peltier effect in the contact area is applied to the first and second electrodes 87 and 88. For example, if the plasmon generator 84 is made of Au and the conductor 86 is made of Co, the current is passed through the second electrode 88, the conductor 86, the plasmon generator 84, and the first electrode 87 in this order. According to the present embodiment, it is thereby possible to cool the plasmon generator 84.

Now, the amount of heat absorption by the Peltier effect in the contact area between the plasmon generator 84 and the conductor 86 will be specifically described. Here, a description will be given for the case where the plasmon generator 84 is made of Au and the conductor 86 is made of Co. The amount of heat absorption Q per unit time at the contact area is given by the following equation (1):

$$Q = \pi_{AB} \times I. \quad (1)$$

Here, $\pi_{AB}$ is the Peltier coefficient, and I is the current that passes through the contact area. The Peltier coefficient $\pi_{AB}$ is given by the following equation (2):

$$\pi_{AB} = (\alpha_A - \alpha_B) \times T \quad (2)$$

Here, $\alpha_A$ is the Seebeck coefficient of the plasmon generator 84 (Au), and $\alpha_B$ is the Seebeck coefficient of the conductor 86 (Co). T is the absolute temperature. As mentioned previously, Au has a Seebeck coefficient of 1.9 µV/K at 300 K, and Co has a Seebeck coefficient of −30.8 µV/K at 300 K. The Peltier coefficient $\pi_{AB}$ at 300 K is thus (1.9−(−30.8))×300=9810 µV=9.81 mV.

As can be seen from the foregoing equations (1) and (2), when the Peltier coefficient $\pi_{AB}$ is not zero, i.e., when the plasmon generator 84 and the conductor 86 have different Seebeck coefficients, it is possible to cause heat absorption by the Peltier effect in the contact area between the plasmon generator 84 and the conductor 86 by making a current to flow from one of the plasmon generator 84 and the conductor 86, the one being lower in Seebeck coefficient, to the other which is higher in Seebeck coefficient, through the contact area. Consequently, it is possible to cool the plasmon generator 84 by the Peltier effect. According to the present embodiment, the cooling operation by the Peltier effect is added to the heat dissipating operation by the extended portions 84B and 84C of the plasmon generator 84. This allows a further suppression of a rise in temperature of the plasmon generator 84.

In the present embodiment, the first electrode 87 is in contact with the extended portion 84B of the plasmon generator 84, and the second electrode 88 is in contact with the extended portion 86C of the conductor 86. Consequently, according to the present embodiment, the heat generated in the plasmon generator 84 can be dissipated through the first electrode 87, and through the conductor 86 and the second electrode 88.

The remainder of configuration, function and effects of the present embodiment are similar to those of the first embodiment.

Fourth Embodiment

Figure 30:
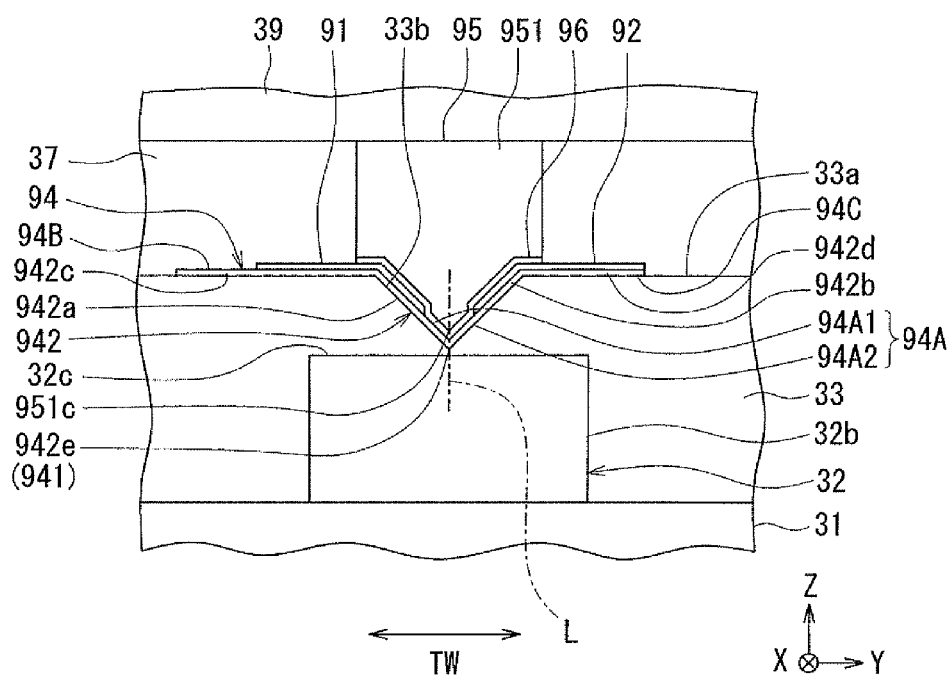
FIG. 30 is a front view showing a part of the medium facing surface of a head unit of a thermally-assisted magnetic recording head according to a fourth embodiment of the invention.

A fourth embodiment of the invention will now be described with reference to FIG. 30. FIG. 30 is a front view showing a part of the medium facing surface of the head unit of the thermally-assisted magnetic recording head according to the present embodiment. The thermally-assisted magnetic recording head according to the present embodiment does not have the first and second electrodes 87 and 88 of the third embodiment. The thermally-assisted magnetic recording head according to the present embodiment has a plasmon generator 94, a magnetic pole 95, a conductor 96, and insulating films 91 and 92, instead of the plasmon generator 84, the magnetic pole 85, the conductor 86, and the insulating films 81 and 82 of the third embodiment. The plasmon generator 94 is made of the same material as that of the plasmon generator 84 of the third embodiment. The magnetic pole 95 is made of the same material as that of the magnetic pole 85 of the third embodiment. The conductor 96 is made of the same material as that of the conductor 86 of the third embodiment. The insulating films 91 and 92 are made of the same material as that of the insulating films 81 and 82 of the third embodiment.

The plasmon generator 94 has an outer surface that includes a plasmon exciting part 941 and a front end face 942. The plasmon exciting part 941 faces the evanescent light generating surface 32c of the core 32 with a predetermined distance therebetween. The front end face 942 is located in the medium facing surface 12a. The plasmon generator 94 further has a V-shaped portion 94A that has an end face located in the medium facing surface 12a. The V-shaped portion 94A has a first sidewall part 94A1 and a second sidewall part 94A2 that are each connected to the plasmon exciting part 941, and that increase in distance from each other with increasing distance from the plasmon exciting part 941. The shapes and locations of the first and second sidewall parts 94A1 and 94A2 are the same as those of the first and second sidewall parts 84A1 and 84A2 of the third embodiment.

The plasmon generator 94 further has an extended portion 94B and an extended portion 94C. The extended portion 94B is connected to an edge of the first sidewall part 94A1 opposite from the plasmon exciting part 941. The extended portion 94C is connected to an edge of the second sidewall part 94A2 opposite from the plasmon exciting part 941. A not-shown lead is connected to the extended portion 94B. The shapes and locations of the extended portions 94B and 94C are the same as those of the extended portions 84B and 84C of the third embodiment. Note that the plasmon generator 94 need not necessarily have the extended portion 94C.

The front end face 942 has a first portion 942a and a second portion 942b that lie at respective ends of the first and second sidewall parts 94A1 and 94A2 and are connected to each other into a V-shape, a third portion 942c that lies at an end of the extended portion 94B, a fourth portion 942d that lies at an end of the extended portion 94C, and a near-field light generating edge 942e that lies at an end of the plasmon exciting part 941. The shape and location of the near-field light generating edge 942e are the same as those of the near-field light generating edge 842e of the third embodiment.

The insulating film 91 is arranged along the inner surface of the first sidewall part 94A1 and the top surface of the extended portion 94B of the plasmon generator 94, and covers the joint between the first sidewall part 94A1 and the extended portion 94B and its vicinity. The insulating film 92 is arranged along the inner surface of the second sidewall part 94A2 and the top surface of the extended portion 94C of the plasmon generator 94, and covers the joint between the second sidewall part 94A2 and the extended portion 94C and its vicinity.

As shown in FIG. 30, the conductor 96 is arranged along the inner surfaces of the V-shaped portion 94A and the top surfaces of the insulating films 91 and 92. The conductor 96 makes contact with the plasmon generator 94 at least on a virtual straight line L, the virtual straight line L passing through the near-field light generating edge 942e and extending in the direction perpendicular to the evanescent light generating surface 32c. In the present embodiment, the conductor 96 makes contact with the plasmon generator 94 on the virtual straight line L passing through the near-field light generating edge 942e and extending in the direction perpendicular to the evanescent light generating surface 32c, and in the vicinity of the virtual straight line L.

The magnetic pole 95 is disposed on the conductor 96 so that the conductor 96 is interposed between the plasmon generator 94 and the magnetic pole 95. The magnetic pole 95 has a portion interposed between the first and second sidewall parts 94A1 and 94A2 of the plasmon generator 94. Between this portion of the magnetic pole 95 and the first and second sidewall parts 94A1 and 94A2, there are interposed respective portions of the conductor 96 and the insulating films 91 and 92. The magnetic pole 95 has an end face 951 located in the medium facing surface 12a. The end face 951 has a portion interposed between the first and second portions 942a and 942b of the front end face 942 of the plasmon generator 94. Between this portion of the end face 951 and the first and second portions 942a and 942b, there are interposed respective portions of the end faces of the conductor 96 and the insulating films 91 and 92 located in the medium facing surface 12a. The end face 951 has a tip 951c located at its bottom end. A not-shown lead is connected to the magnetic pole 95.

The conductor 96 is electrically connected to the magnetic pole 95. The magnetic pole 95 is formed by frame plating, for example. The conductor 96 may be used as an electrode film when forming the magnetic pole 95 by frame plating.

The operation and effects of the thermally-assisted magnetic recording head according to the present embodiment will now be described. In the present embodiment, as shown in FIG. 30, the conductor 96 makes contact with the plasmon generator 94 at least on the virtual straight line L that passes through the near-field light generating edge 942e and extends in the direction perpendicular to the evanescent light generating surface 32c. In the present embodiment, as in the third embodiment, heat absorption by the Peltier effect occurs in the contact area between the plasmon generator 94 and the conductor 96 when a current is made to flow from one of the plasmon generator 94 and the conductor 96, the one being lower in Seebeck coefficient, to the other which is higher in Seebeck coefficient, through the contact area. In the present embodiment, the conductor 96 is electrically connected to the magnetic pole 95. A voltage for generating the current that causes the heat absorption by the Peltier effect in the contact area is applied to the plasmon generator 94 and the magnetic pole 95. According to the present embodiment, it is thereby possible to cool the plasmon generator 94.

In the present embodiment, the insulating films 91 and 92 insulate part of the plasmon generator 94 from part of the conductor 96 so that the contact area between the plasmon generator 94 and the conductor 96 is formed in a limited area close to the near-field light generating edge 942e. According to the present embodiment, it is therefore possible to cause the heat absorption by the Peltier effect in proximity to the near-field light generating edge 942e where the plasmon generator 94 becomes highest in temperature. Consequently, according to the present embodiment, the near-field light generating edge 942e of the plasmon generator 94 can be cooled more efficiently as compared with the case where the contact area between the plasmon generator 94 and the conductor 96 has a greater area than in the embodiment, provided that the amount of heat absorption by the Peltier effect is the same. As a result, it is possible to suppress a rise in temperature of the near-field light generating edge 942e where the plasmon generator 94 becomes highest in temperature.

The remainder of configuration, function and effects of the present embodiment are similar to those of the third embodiment.

The present invention is not limited to the foregoing embodiments, and various modifications may be made thereto. For example, in the third and fourth embodiments, the plasmon generator may have the same configuration as that of the plasmon generator 34 of the second embodiment.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A thermally-assisted magnetic recording head comprising:
a medium facing surface that faces a magnetic recording medium;
a magnetic pole that has an end face located in the medium facing surface and produces a write magnetic field for writing data on the magnetic recording medium;
a waveguide including a core and a clad, the core propagating light; and
a plasmon generator, wherein:
the core has an evanescent light generating surface that generates evanescent light based on the light propagated through the core;
the plasmon generator has an outer surface, the outer surface including: a plasmon exciting part that faces the evanescent light generating surface with a predetermined distance therebetween; and a front end face located in the medium facing surface;
the plasmon generator has: a first sidewall part and a second sidewall part that are each connected to the plasmon exciting part, the first and second sidewall parts increasing in distance from each other with increasing distance from the plasmon exciting part; and at least one extended portion that is connected to an edge of at least one of the first and second sidewall parts, the edge being opposite from the plasmon exciting part;
from the edge of the at least one of the first and second sidewall parts opposite from the plasmon exciting part, the at least one extended portion extends parallel to the evanescent light generating surface and away from both the first and second sidewall parts;
the magnetic pole has a portion interposed between the first and second sidewall parts;
the front end face includes: a first portion and a second portion that lie at respective ends of the first and second sidewall parts and are connected to each other into a V-shape; at least one third portion that lies at an end of the at least one extended portion; and a near-field light generating edge that lies at an end of the plasmon exciting part;
the end face of the magnetic pole has a portion interposed between the first and second portions of the front end face;
a surface plasmon is excited on the plasmon exciting part through coupling with the evanescent light generated from the evanescent light generating surface; and
the near-field light generating edge generates near-field light based on the surface plasmon excited on the plasmon exciting part.

2. The thermally-assisted magnetic recording head according to claim 1, wherein the magnetic pole is in contact with the plasmon generator.

3. The thermally-assisted magnetic recording head according to claim 1, wherein:
the first and second sidewall parts are connected to each other so that the connected first and second sidewall parts have a V-shaped cross section parallel to the medium facing surface;
the plasmon exciting part includes a propagative edge that lies at an end of the connected first and second sidewall parts closer to the evanescent light generating surface; and
the near-field light generating edge lies at an end of the propagative edge.

4. The thermally-assisted magnetic recording head according to claim 1, wherein:
the plasmon generator further has a bottom part that is shaped like a plate and connects the first and second sidewall parts to each other at their respective edges closer to the evanescent light generating surface;
the plasmon exciting part includes a flat surface part that is formed by a surface of the bottom part that is closer to the evanescent light generating surface; and
the flat surface part includes a width changing portion, the width changing portion having a width that decreases with decreasing distance to the medium facing surface, the width being in a direction parallel to the medium facing surface and the evanescent light generating surface.

5. The thermally-assisted magnetic recording head according to claim 1, further comprising a buffer part that is located between the evanescent light generating surface and the plasmon exciting part and has a refractive index lower than that of the core.

6. The thermally-assisted magnetic recording head according to claim 1, wherein a dimension of the first and second sidewall parts in a direction perpendicular to the evanescent light generating surface falls within a range of 200 to 400 nm.

7. The thermally-assisted magnetic recording head according to claim 1, wherein a dimension of the front end face on a virtual straight line that passes through the near-field light generating edge and extends in a direction perpendicular to the evanescent light generating surface falls within a range of 20 to 70 nm.

8. The thermally-assisted magnetic recording head according to claim 1, further comprising a conductor made of a conductive material, the conductor having a Seebeck coefficient different from that of the plasmon generator and being in contact with the plasmon generator,
wherein heat absorption by the Peltier effect occurs in a contact area between the plasmon generator and the conductor when a current is made to flow from one of the plasmon generator and the conductor, the one being lower in Seebeck coefficient, to the other which is higher in Seebeck coefficient, through the contact area.

9. The thermally-assisted magnetic recording head according to claim 8, wherein the plasmon generator is made of Au, and the conductive material contains at least one of Co, Ni, and a CuNi alloy.

10. The thermally-assisted magnetic recording head according to claim 8, wherein the conductor is in contact with the plasmon generator on at least a virtual straight line that passes through the near-field light generating edge and extends in a direction perpendicular to the evanescent light generating surface.

11. The thermally-assisted magnetic recording head according to claim 10, wherein a dimension of the conductor on the virtual straight line falls within a range of 20 to 50 nm.

12. The thermally-assisted magnetic recording head according to claim 8, wherein at least part of the conductor is interposed between the plasmon generator and the magnetic pole.

13. The thermally-assisted magnetic recording head according to claim 8, further comprising a first electrode that is electrically connected to the plasmon generator and a second electrode that is electrically connected to the conductor, wherein a voltage for generating the current is applied to the first and second electrodes.

14. The thermally-assisted magnetic recording head according to claim 8, wherein the conductor is electrically connected to the magnetic pole, and a voltage for generating the current is applied to the plasmon generator and the magnetic pole.

15. A head gimbal assembly comprising: the thermally-assisted magnetic recording head according to claim 1; and a suspension that supports the thermally-assisted magnetic recording head.

16. A magnetic recording device comprising: a magnetic recording medium; the thermally-assisted magnetic recording head according to claim 1; and a positioning device that supports the thermally-assisted magnetic recording head and positions the thermally-assisted magnetic recording head with respect to the magnetic recording medium.

* * * * *